United States Patent
Oh et al.

(10) Patent No.: US 12,307,726 B2
(45) Date of Patent: May 20, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD, WHERE THE OCTREE INCLUDES A DIRECT NODE HAVING A SINGLE POSITION OF ONE POINT

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 18/008,347

(22) PCT Filed: Jun. 18, 2021

(86) PCT No.: PCT/KR2021/007649
§ 371 (c)(1),
(2) Date: Dec. 5, 2022

(87) PCT Pub. No.: WO2021/256885
PCT Pub. Date: Dec. 23, 2021

(65) Prior Publication Data
US 2023/0281878 A1   Sep. 7, 2023

(30) Foreign Application Priority Data
Jun. 18, 2020   (KR) .................. 10-2020-0074005

(51) Int. Cl.
*H04N 19/119*   (2014.01)
*G06T 9/00*   (2006.01)
(Continued)

(52) U.S. Cl.
CPC ............... *G06T 9/001* (2013.01); *G06T 9/40* (2013.01)

(58) Field of Classification Search
None
See application file for complete search history.

(56) References Cited

U.S. PATENT DOCUMENTS

| | | | |
|---|---|---|---|
| 2019/0080483 A1* | 3/2019 | Mammou | G06T 7/50 |
| 2020/0020132 A1* | 1/2020 | Sinharoy | H03M 7/3059 |
| 2022/0191520 A1* | 6/2022 | Kato | H04N 19/30 |

FOREIGN PATENT DOCUMENTS

| | | |
|---|---|---|
| EP | 3929881 A1 | 12/2021 |
| KR | 1020190053129 A | 5/2019 |

(Continued)

OTHER PUBLICATIONS

Mammou et al. [G-PCC codec description v2, ISO/IEC JTC1/SC29/WG11 Coding of Moving Pictures and Audio N19091, X030287973, Brussels, BE, Jan. 2020].*

(Continued)

*Primary Examiner* — Edemio Navas, Jr.
(74) *Attorney, Agent, or Firm* — Bryan Cave Leighton Paisner LLP

(57) ABSTRACT

A point cloud data transmission method according to embodiments may comprise the steps of: encoding point cloud data; and transmitting a bitstream comprising the point cloud data. A point cloud data reception method according to embodiments may comprise the steps of: receiving a bitstream including point cloud data; and decoding the point cloud data.

20 Claims, 32 Drawing Sheets

(51) Int. Cl.
*G06T 9/40* (2006.01)
*H04N 19/30* (2014.01)
*H04N 19/597* (2014.01)
*H04N 19/70* (2014.01)
*H04N 19/96* (2014.01)

(56) References Cited

FOREIGN PATENT DOCUMENTS

| | | | |
|---|---|---|---|
| KR | 1020200039757 A | 4/2020 | |
| KR | 1020200053499 A | 5/2020 | |
| WO | 2019240284 A1 | 12/2019 | |
| WO | 2020-072665 A1 | 4/2020 | |

OTHER PUBLICATIONS

K. Mammou et al., "G-PCC codec description v2", International Organisation for Standardisation Organisation Internationale de Normalisation ISO/IEC JTC1/SC29/WG11 Coding of Moving Pictures and Audio, N18189, Jan. 2019.

Mammou, Khaled et al., "G-PCC codec description v2", ISO/IEC JTC1/SC29/WG11 Coding of Moving Pictures and Audio N18189, Marrakech, MA, Jan. 2019.

3DG, "G-PCC codec description v6", ISO/IEC JTC1/SC29/WG11 Coding of Moving Pictures and Audio N19091, X030287973, Brussels, BE, Jan. 2020.

\* cited by examiner

FIG. 6
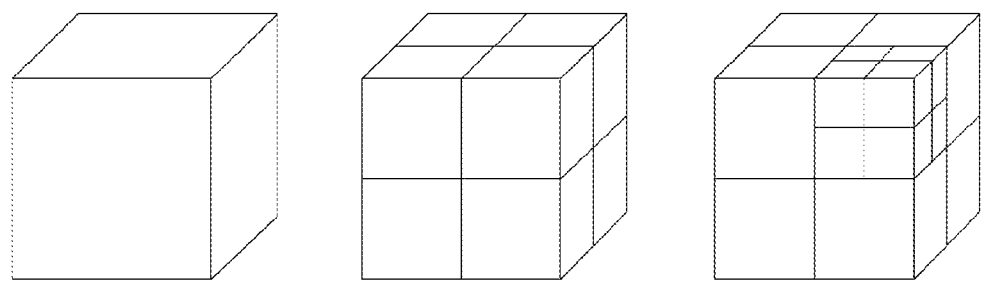
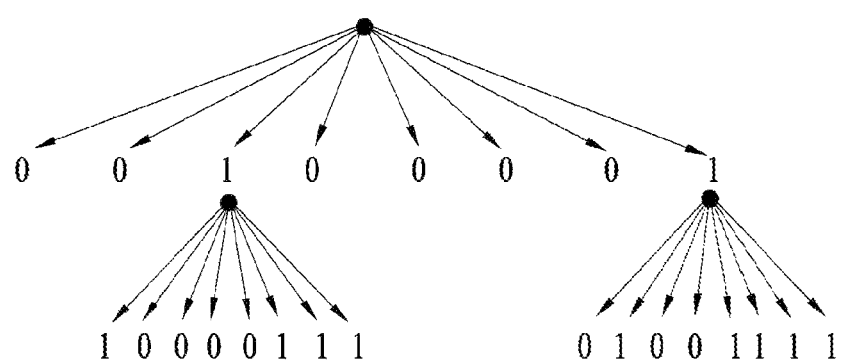

FIG. 7
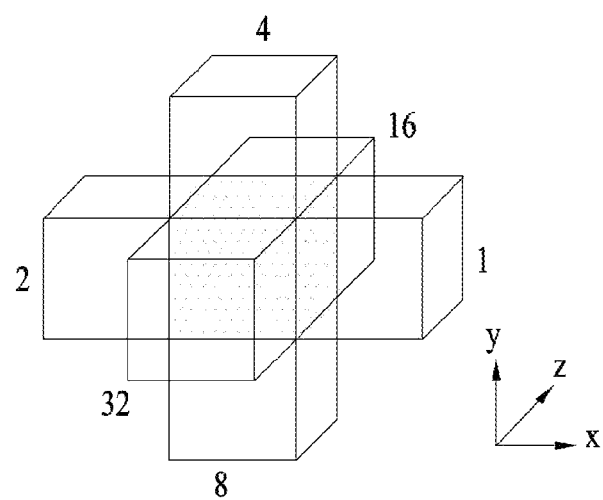
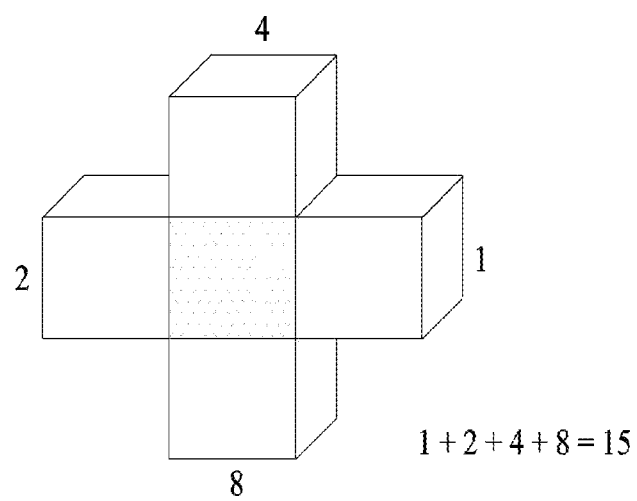
$1+2+4+8=15$

FIG. 17

| Depth | Attribute numNode | Geometry numNodes |
|---|---|---|
| 0 | 1 | 1 |
| 1 | 4 | 4 |
| 2 | 12 | 12 |
| 3 | 35 | 35 |
| 4 | 114 | 114 |
| 5 | 470 | 470 |
| 6 | 1163 | 1165 |
| 7 | 3096 | 3103 |
| 8 | 7588 | 7600 |
| 9 | 17088 | 17129 |
| 10 | 32939 | 33024 |
| 11 | 54315 | 52189 |
| 12 | 70911 | 70658 |
| 13 | 77315 | 77287 |
| 14 | 78181 | 78127 |
| 15 | 78440 | 78414 |
| 16 | 78722 | 78663 |
| 17 | 79224 | 79096 |
| 18 | 80265 | 80029 |

FIG. 27

| attribute_parameter_set( ) { | Descriptor |
|---|---|
| .... | |
|    constrained_IDCM_flag | u(1) |
|    if( ! constrained_IDCM_flag ){ | |
|       direct_coded_point_considered_LoD_generation_enable_flag | u(1) |
|       if( direct_coded_point_considered_LoD_generation_enable_flag ) | |
|          occupied_node_first_flag | u(8) |
|       else | |
|          num_scalable_levels | u(1) |
|          for (k=0; k< num_scalable_levels; k++) | |
|             matched_depth_index[k] | u(8) |
|    } | |
| .... | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD, WHERE THE OCTREE INCLUDES A DIRECT NODE HAVING A SINGLE POSITION OF ONE POINT

CROSS-REFERENCE TO RELATED APPLICATION

This application is the National Stage filing under 35 U.S.C. 371 of International Application No. PCT/KR2021/007649, filed on Jun. 18, 2021, which claims the benefit of earlier filing date and right of priority to Korean Patent Application No. 10-2020-0074005, filed on Jun. 18, 2020, the contents of which are all incorporated by reference herein in their entireties.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method for transmitting point cloud data may include encoding the point cloud data, and transmitting a bitstream containing the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 17 illustrates an example of a geometry node and an attribute node according to embodiments;

FIG. 27 shows an attribute parameter set according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
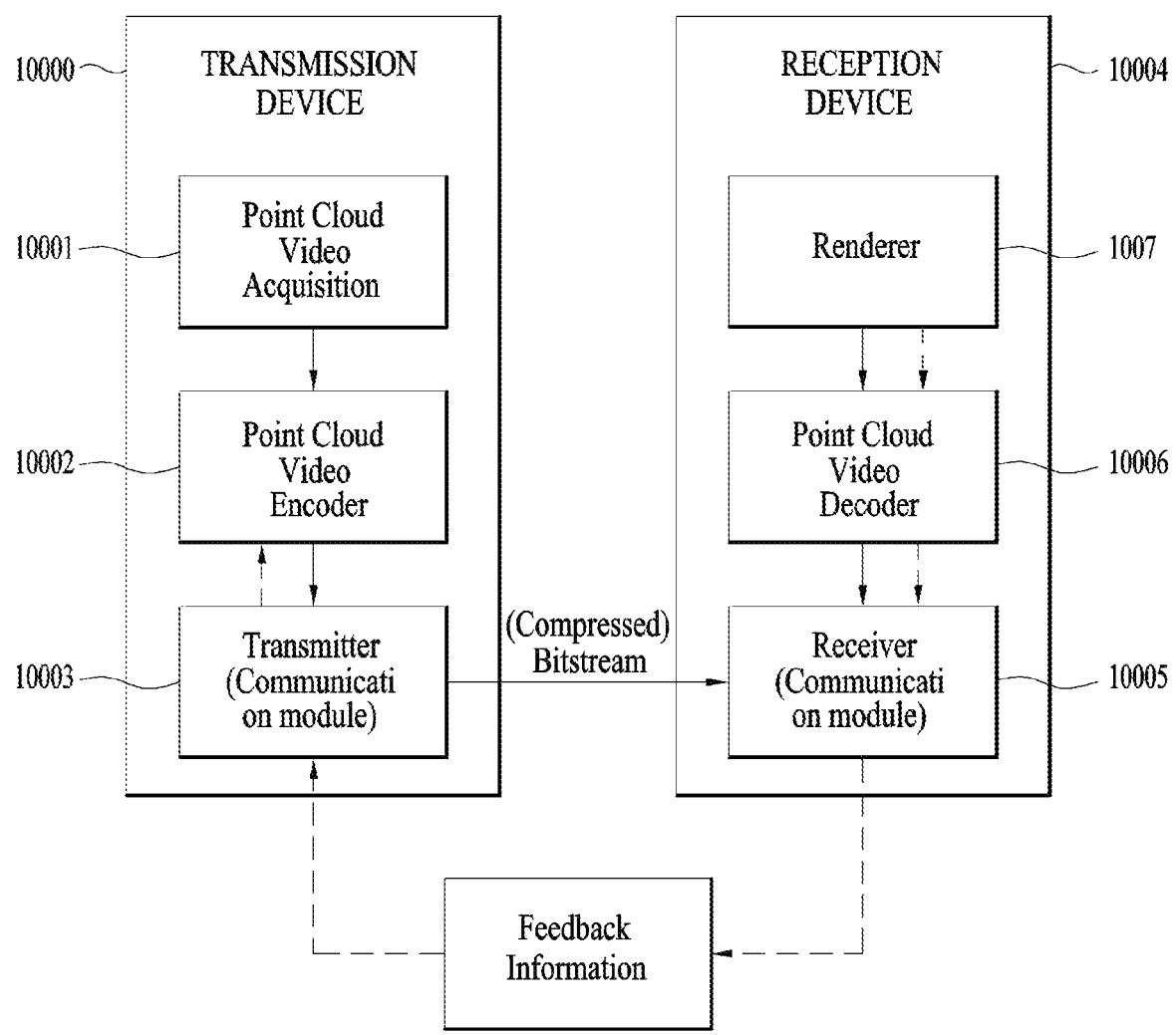
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
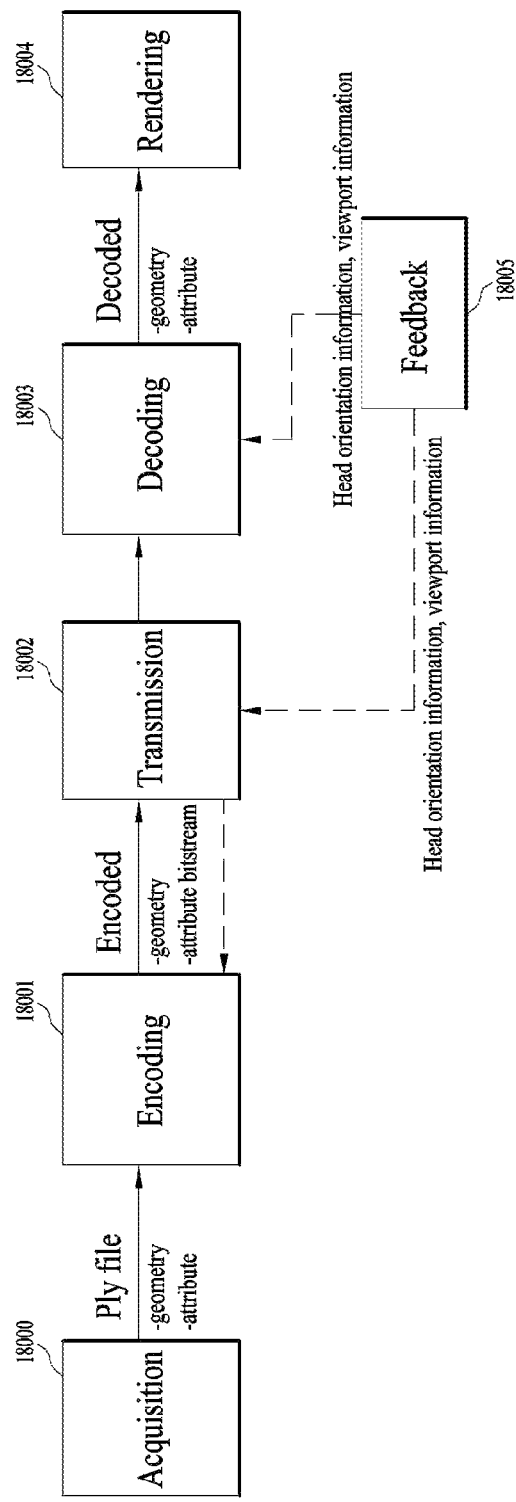
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
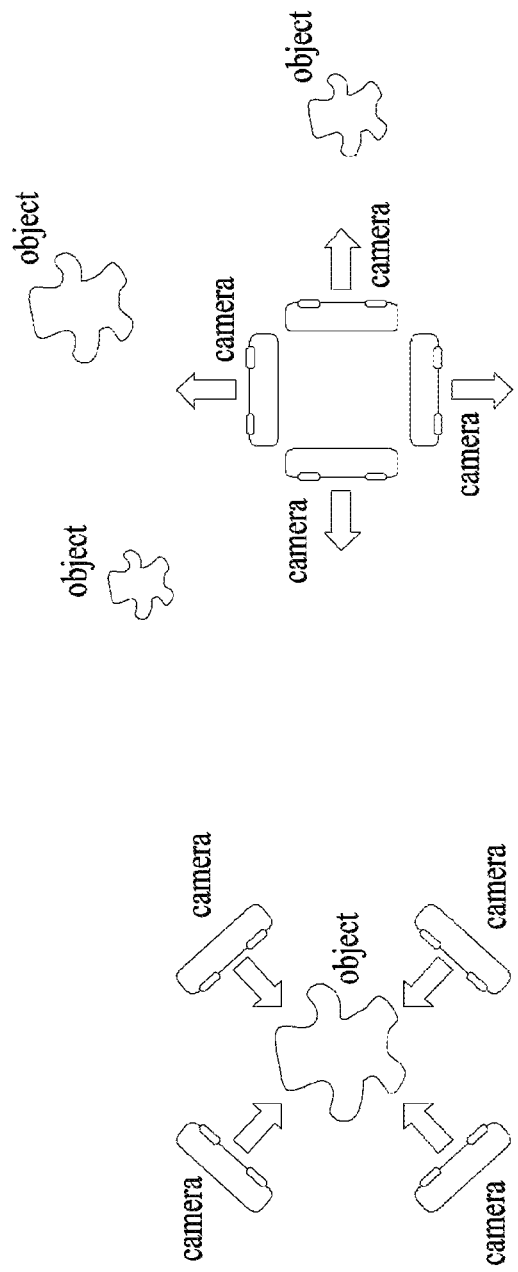
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
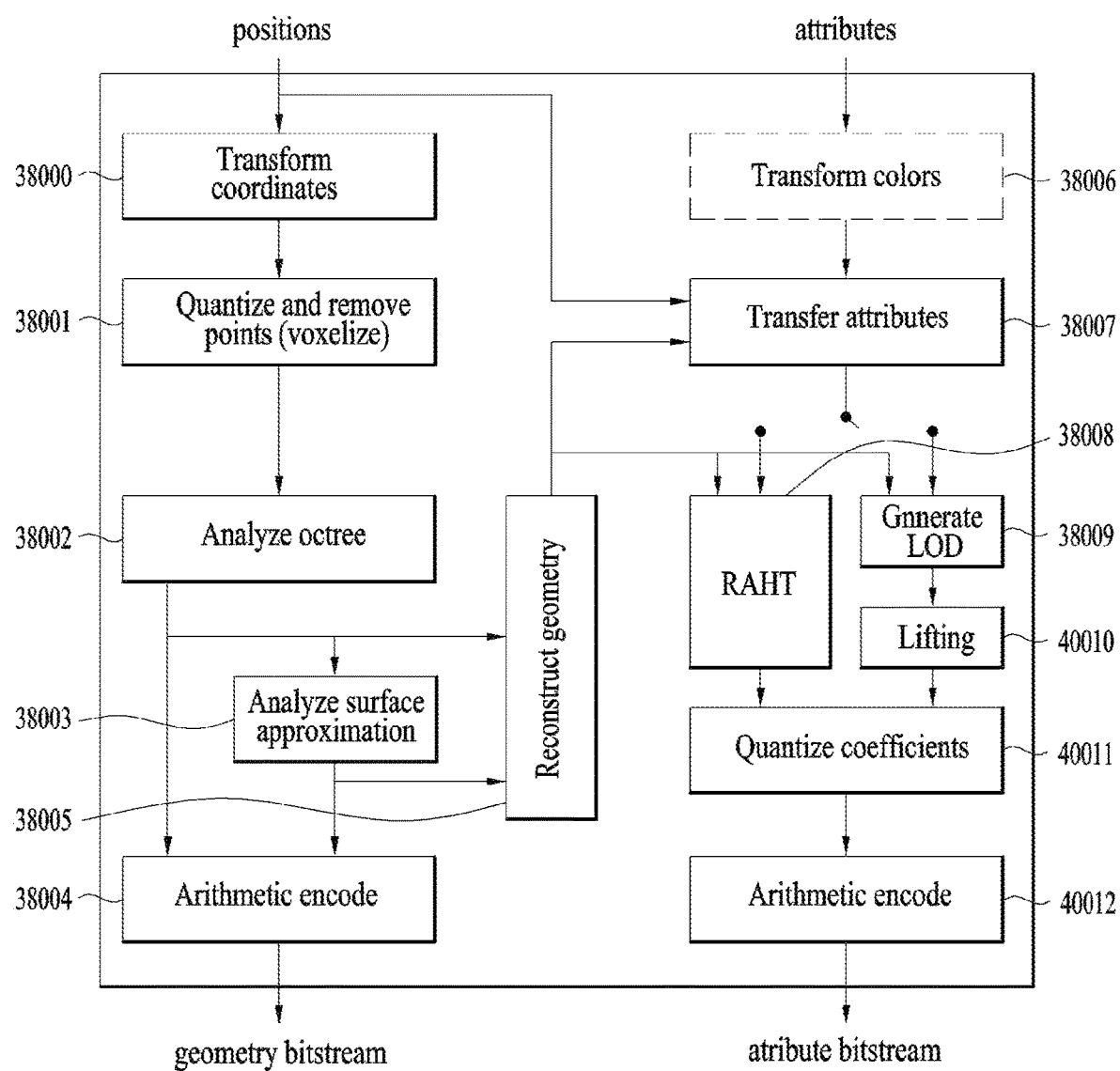
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup the geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
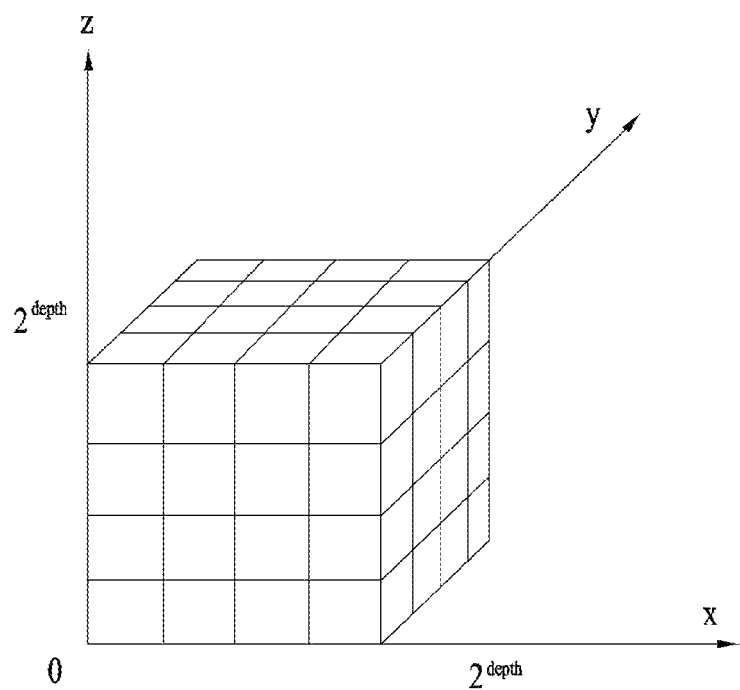
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and $(2^d, 2^d, 2^d)$ is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\text{Ceil}(\text{Log } 2(\text{Max}(x_n^{inr}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad \text{i)}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1,...,n

| n | triangles |
|---|---|
| 3 | (1,2,3) |
| 4 | (1,2,3), (3,4,1) |
| 5 | (1,2,3), (3,4,5), (5,1,3) |
| 6 | (1,2,3), (3,4,5), (5,6,1), (1,3,5) |
| 7 | (1,2,3), (3,4,5), (5,6,7), (7,1,3), (3,5,7) |
| 8 | (1,2,3), (3,4,5), (5,6,7), (7,8,1), (1,3,5), (5,7,1) |
| 9 | (1,2,3), (3,4,5), (5,6,7), (7,8,9), (9,1,3), (3,5,7), (7,9,3) |
| 10 | (1,2,3), (3,4,5), (5,6,7), (7,8,9), (9,10,1), (1,3,5), (5,7,9), (9,1,5) |
| 11 | (1,2,3), (3,4,5), (5,6,7), (7,8,9), (9,10,11), (11,1,3), (3,5,7), (7,9,11), (11,3,7) |
| 12 | (1,2,3), (3,4,5), (5,6,7), (7,8,9), (9,10,11), (11,12,1), (1,3,5), (5,7,9), (9,11,1), (1,5,9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
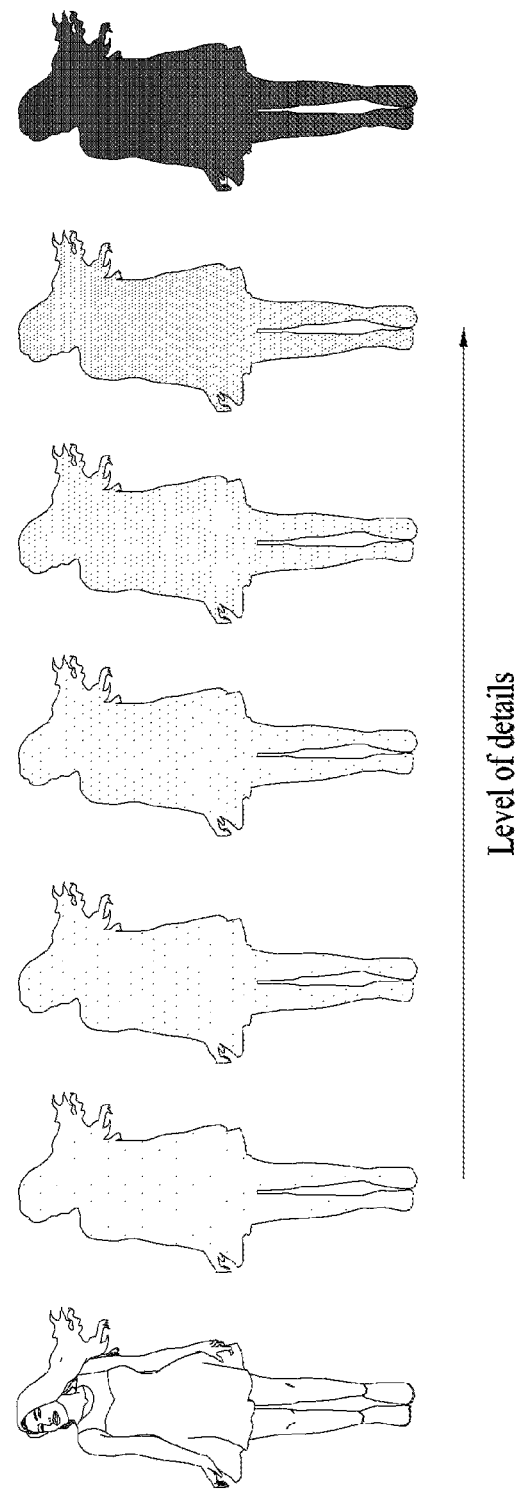
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
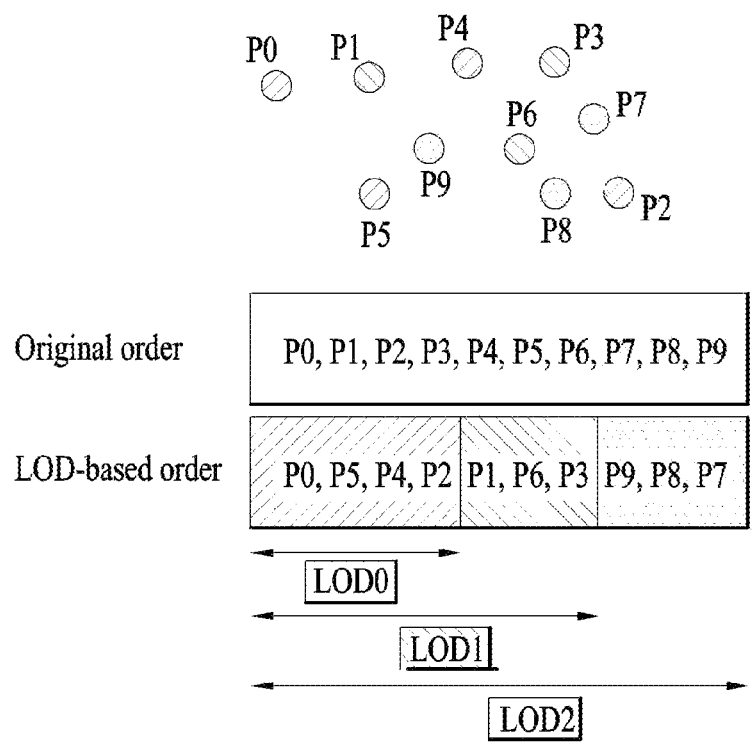
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
if(value >=0) {
return floor(value / quantStep + 1.0 / 3.0);
} else {
return -floor(-value / quantStep + 1.0 / 3.0);
}
}
```

TABLE

Attribute prediction residuals inverse quantization pseudo code

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1\,w2} \begin{bmatrix} g_{l_{2x,y,z}} \\ g_{l_{2x+1,y,z}} \end{bmatrix},$$

$$T_{w1\,w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{l_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

Figure 10:
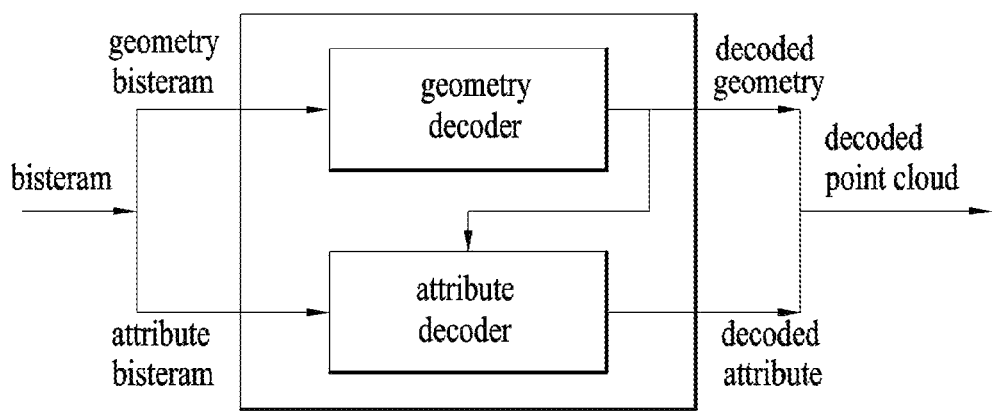
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
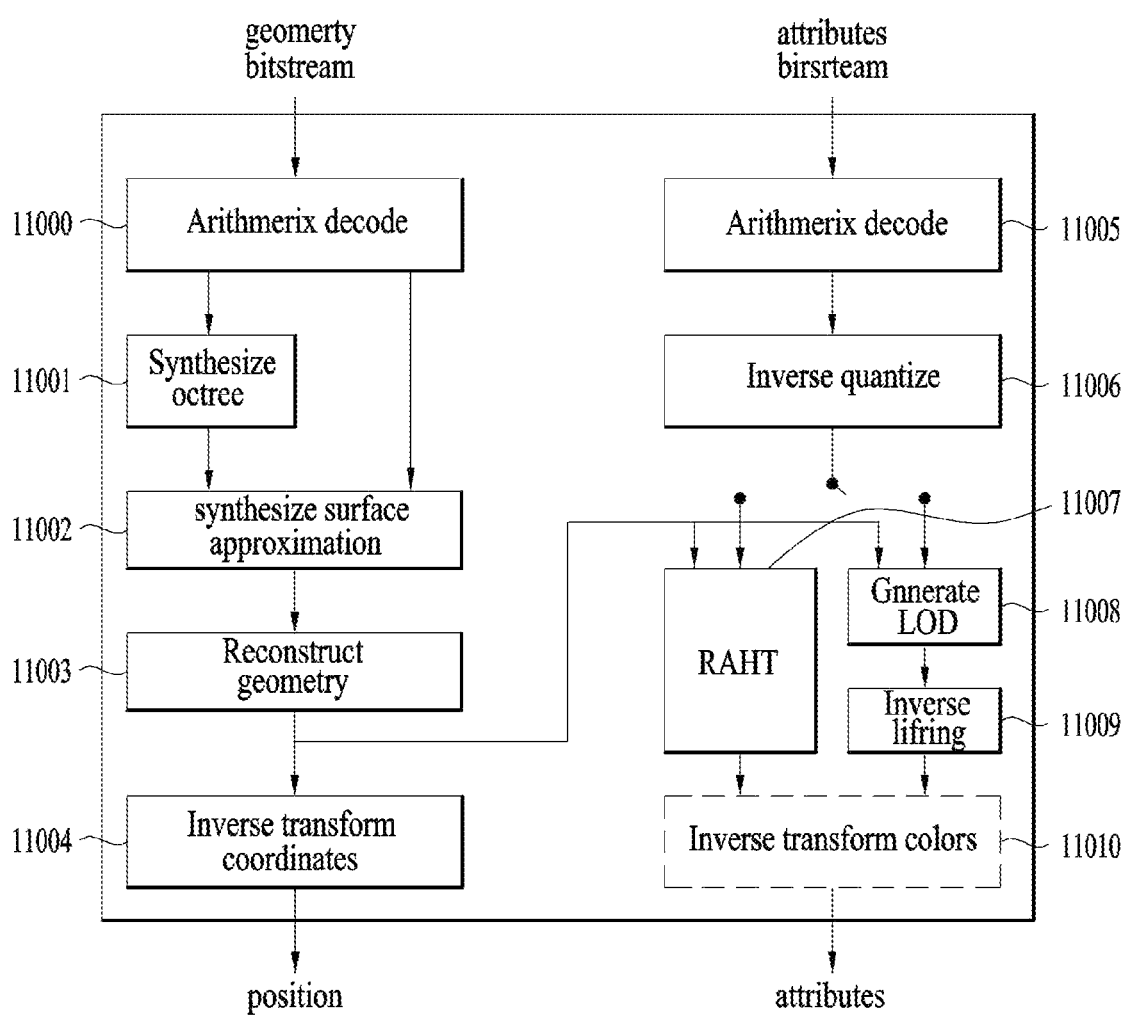
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
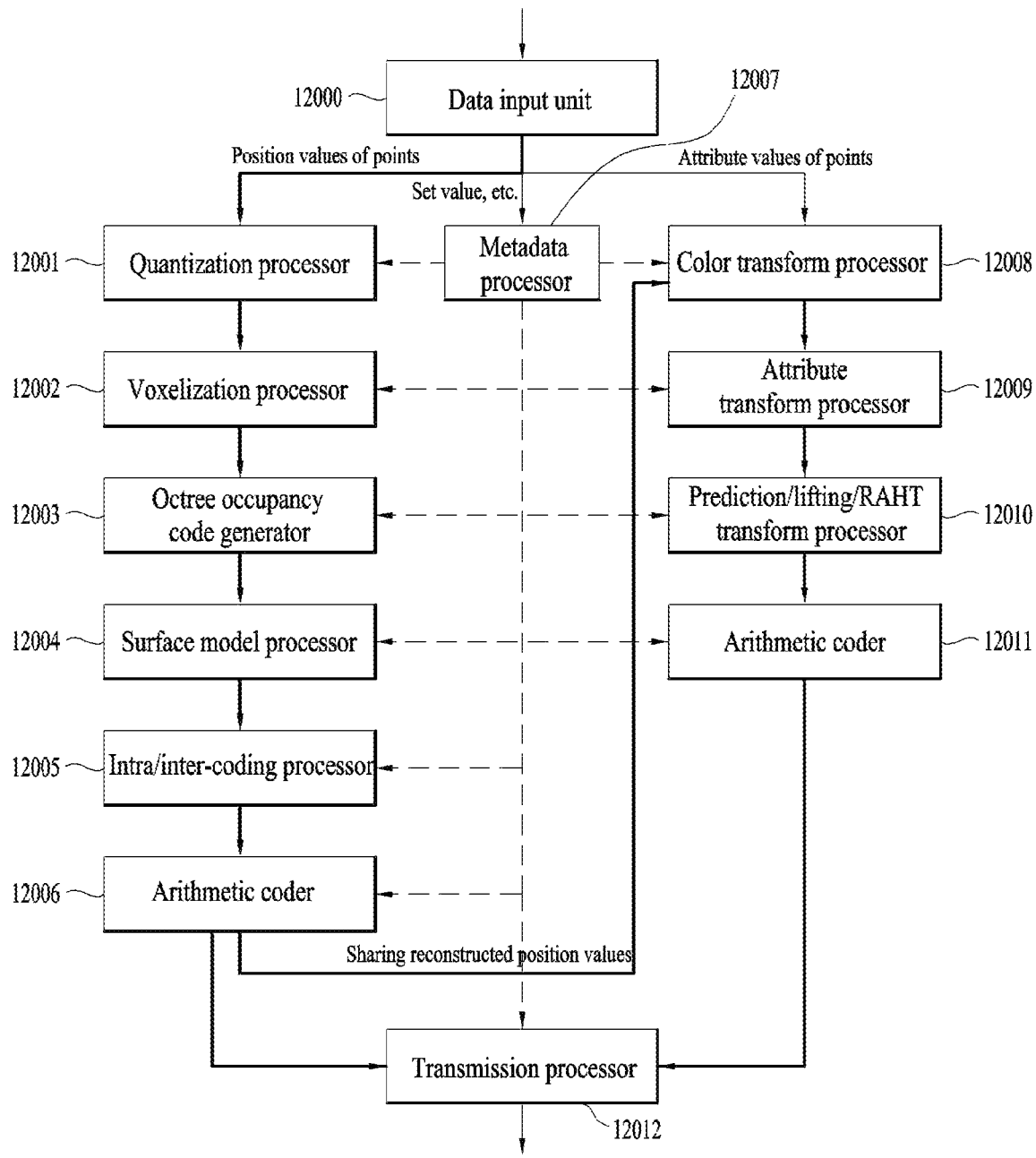
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
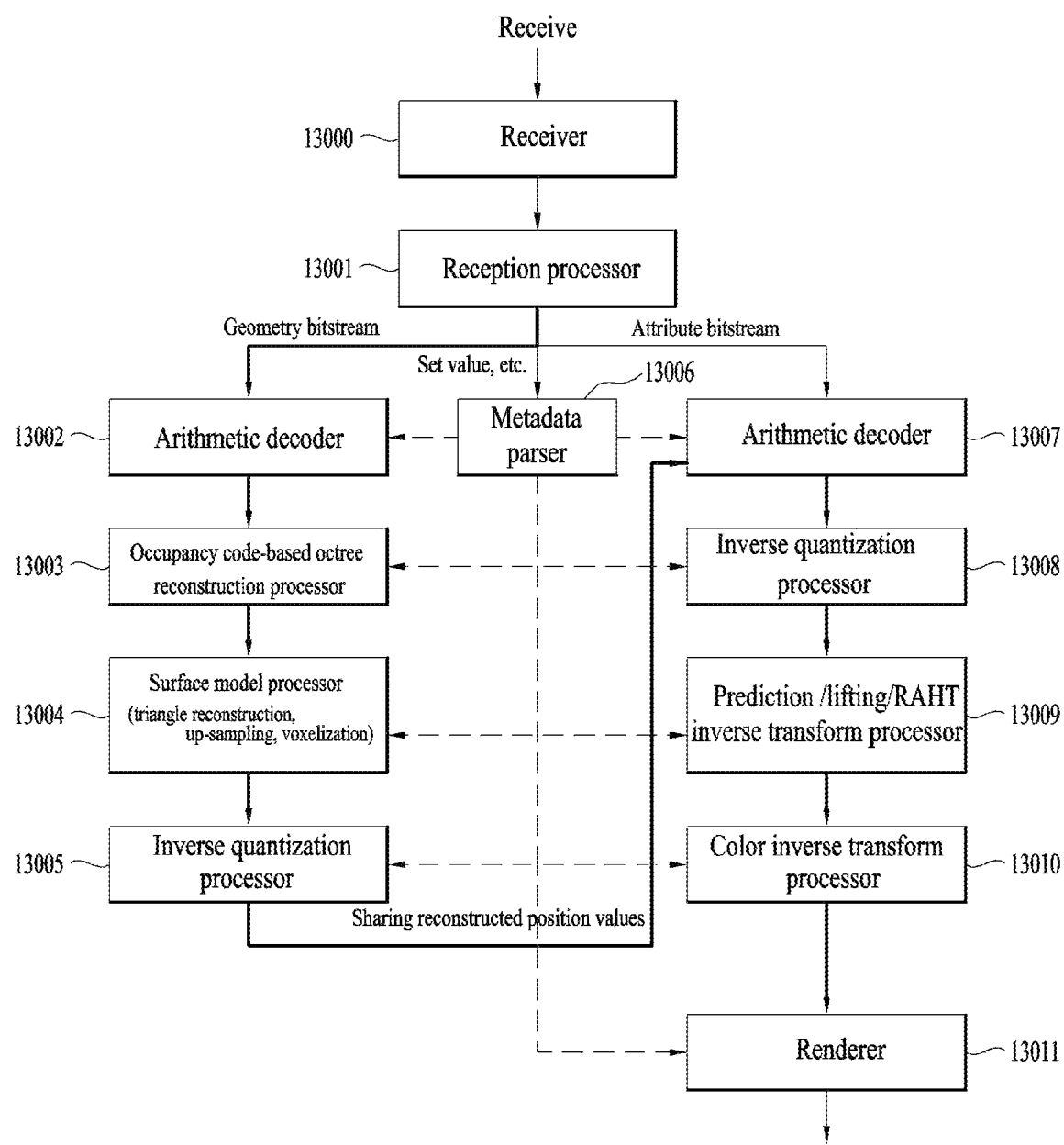
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
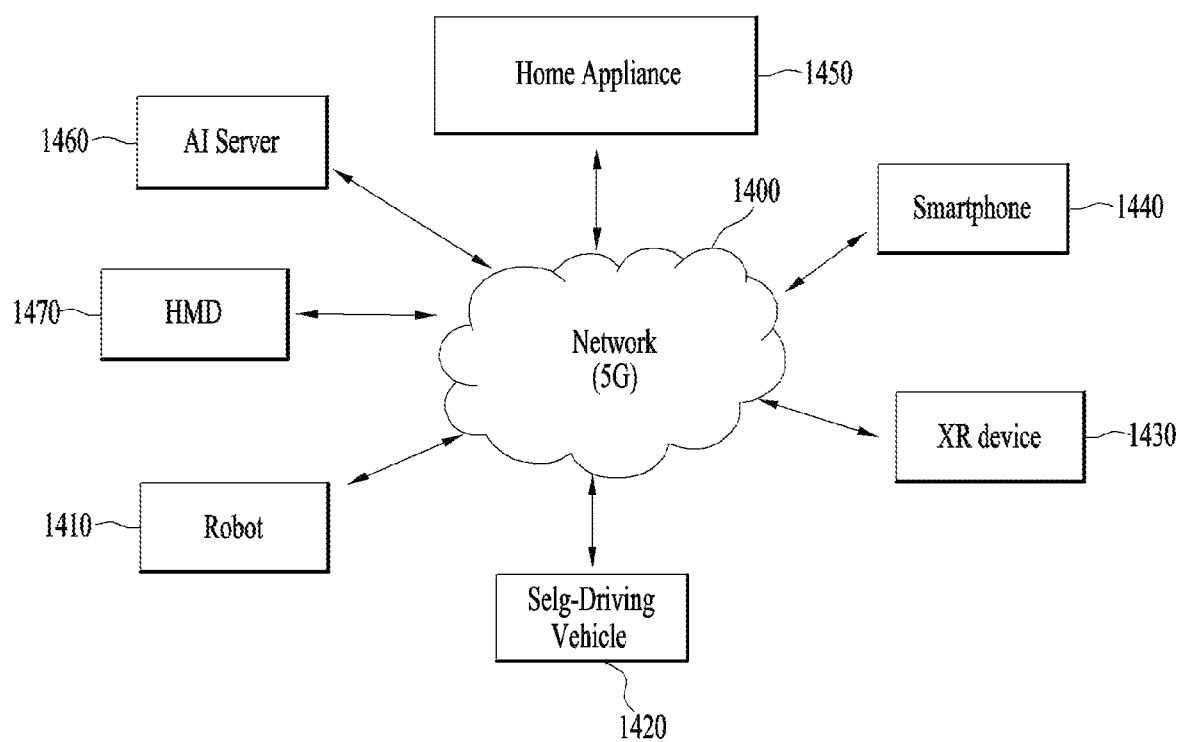
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 20:
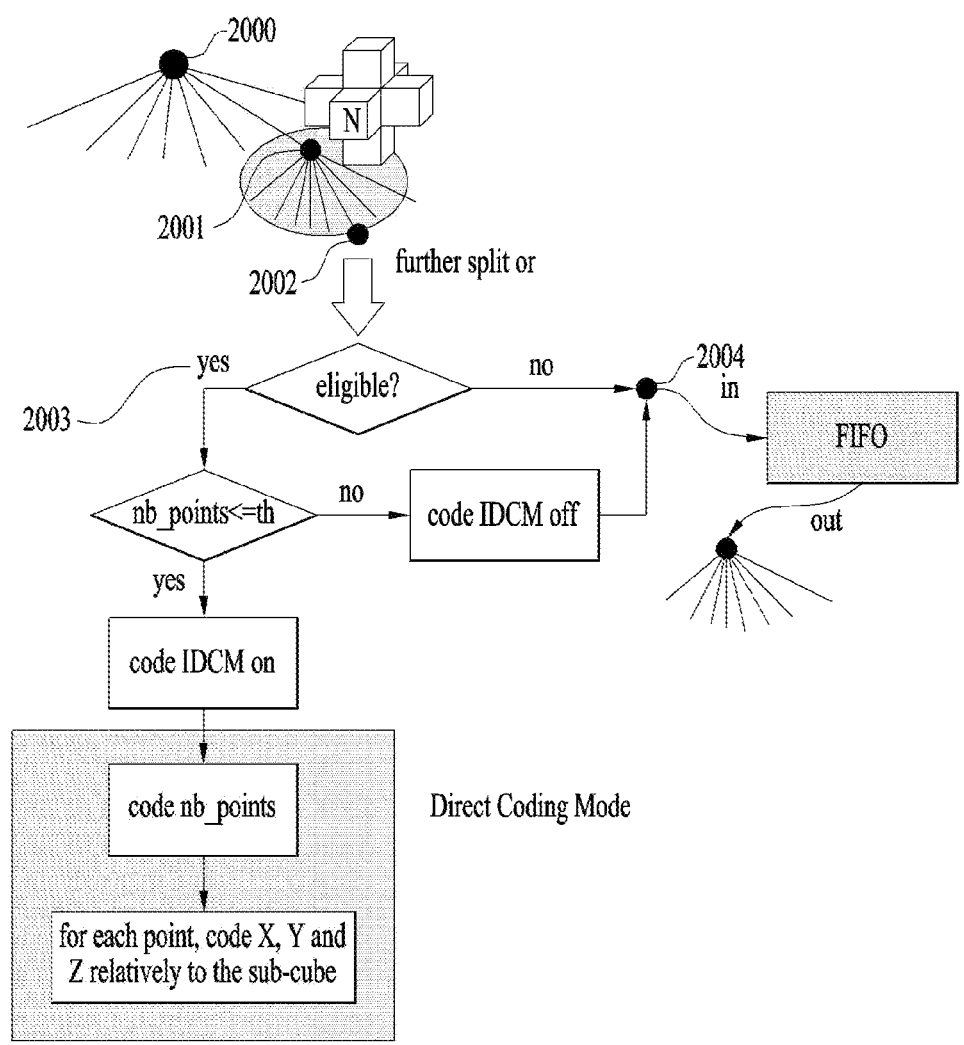
FIG. 20 is a flowchart illustrating direct coding according to embodiments.
Figure 22:
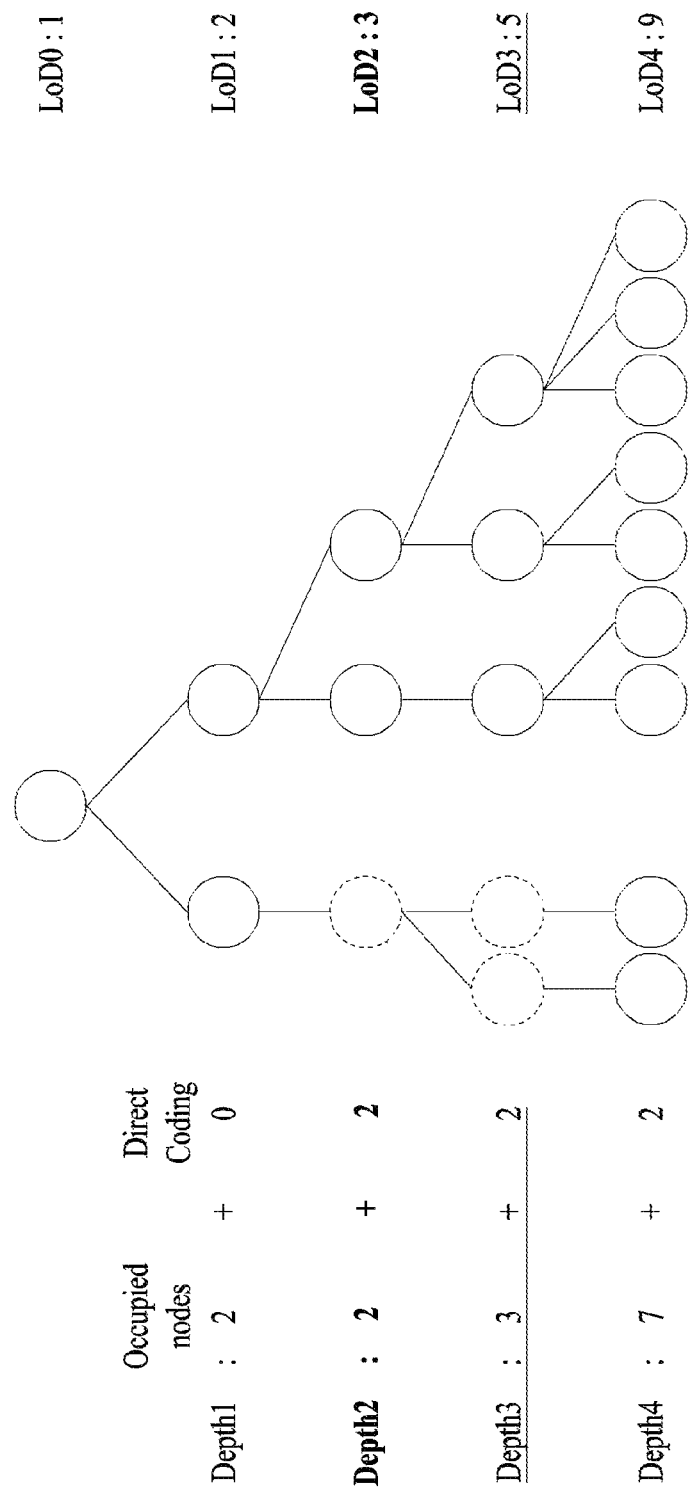
FIG. 22 illustrates a hierarchical structure of point cloud data according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoding process of FIGS. 20 and 22, and the like.

Figure 21:
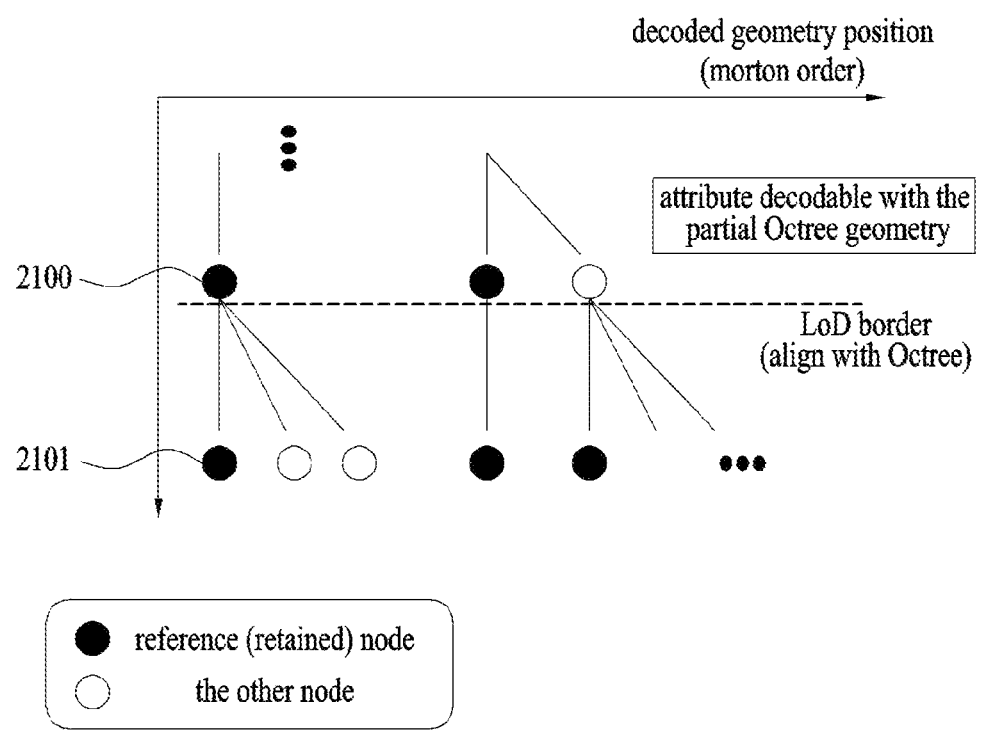
FIG. 21 illustrates an example of scalable attribute coding according to embodiments.
Figure 23:
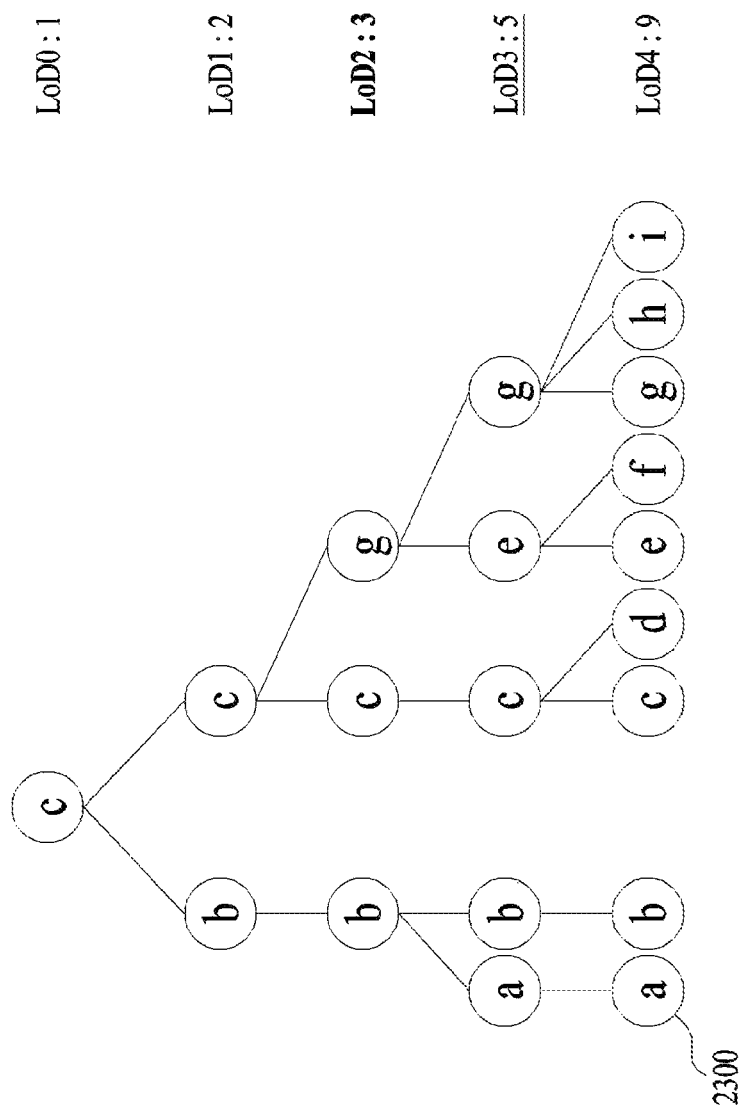
FIG. 23 shows an example of attribute data according to embodiments.

The point cloud data reception method/device according to embodiments may be construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoding process of FIGS. 21 and 23, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

Figure 15:
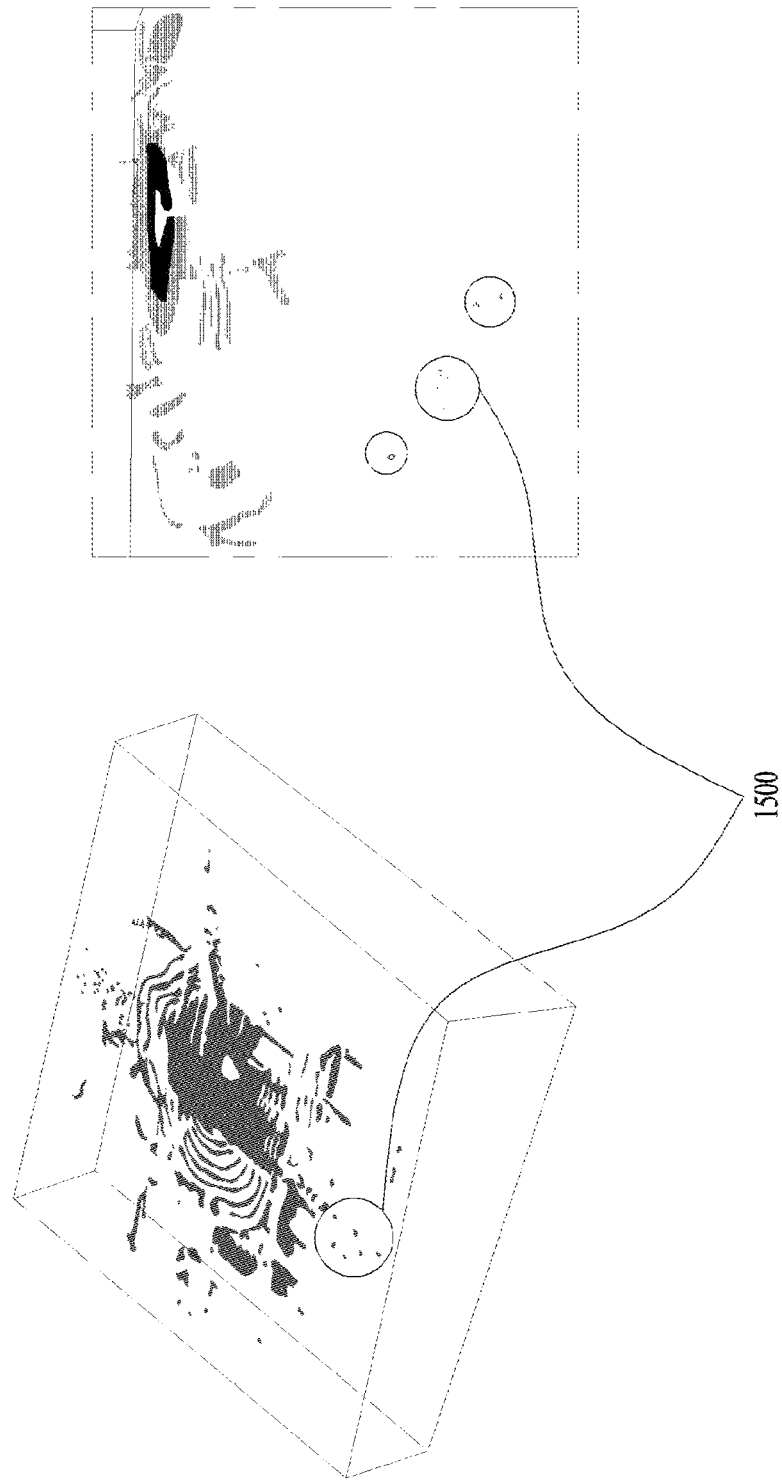
FIG. 15 illustrates point cloud data according to embodiments.

FIG. 15 illustrates point cloud data according to embodiments.

Figure 16:
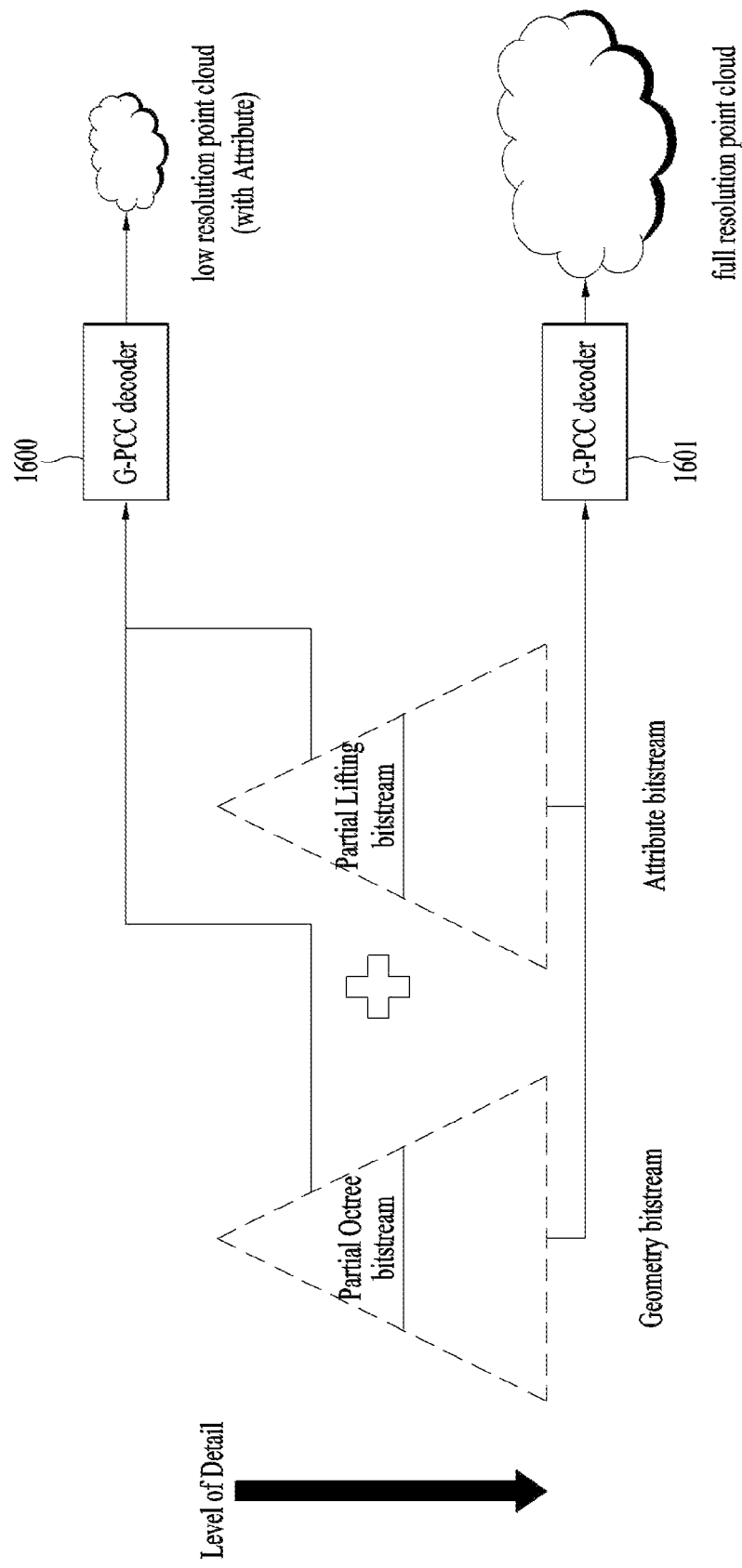
FIG. 16 illustrates a point cloud data encoding and decoding procedure according to embodiments.
Figure 28:
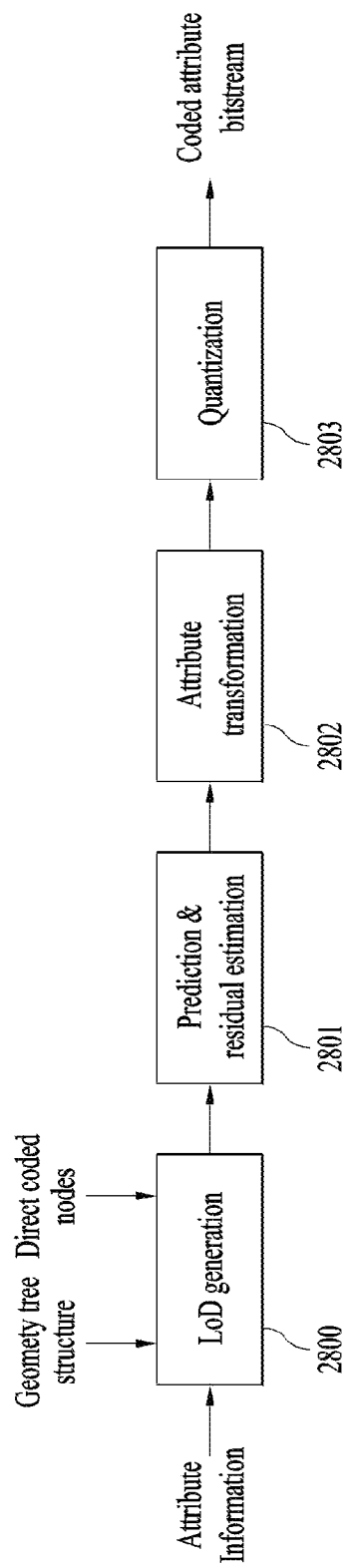
FIG. 28 illustrates attribute encoding of point cloud data according to embodiments.

The transmission device 10000 of FIG. 1, the point cloud video encoder 10002, the encoding of FIG. 2, the encoder of FIG. 4, the transmission device of FIG. 12, the device of FIG. 14, the point cloud data transmission device of FIG. 16, the point cloud data transmission device of FIG. 28, or a corresponding point cloud data transmission/reception device according to embodiments that may be implemented by hardware including one or more processors or integrated circuits configured to communicate with one or more memories included in the point cloud data transmission device, software, firmware, or a combination thereof may compress (encode) the point cloud data as shown in FIG. 15.

Figure 29:
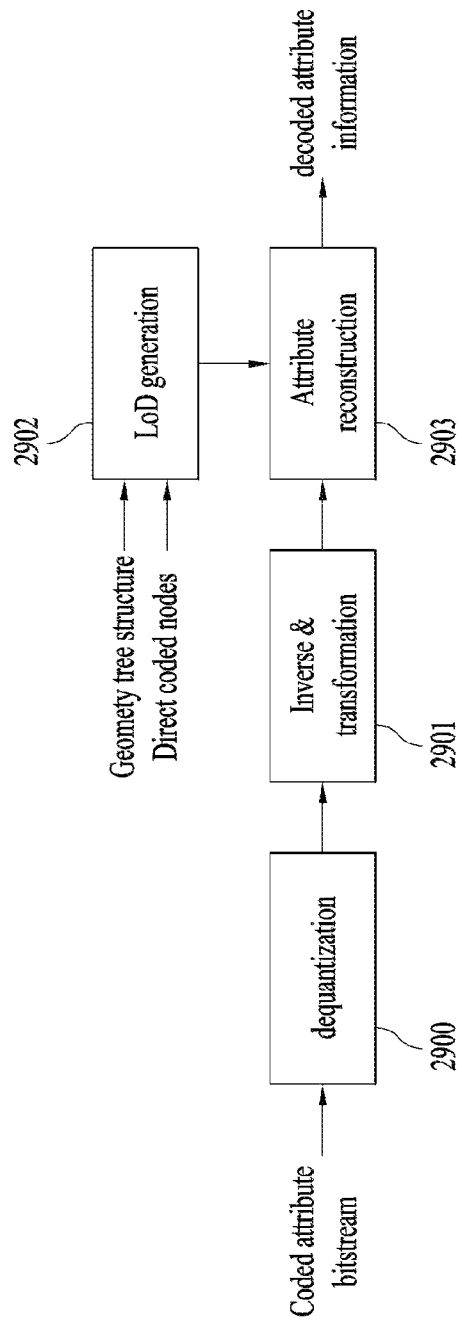
FIG. 29 illustrates attribute decoding of point cloud data according to embodiments.

The reception device 10004 of FIG. 1, the point cloud video decoder 10006, the decoding of FIG. 2, the decoder of FIGS. 10 and 11, the reception device of FIG. 13, the device of FIG. 14, and the point cloud data reception device of FIGS. 17 and 29, or a corresponding point cloud data transmission/reception device according to embodiments that may be implemented by hardware including one or more processors or integrated circuits configured to communicate with one or more memories included in the point cloud data transmission device, software, firmware, or a combination thereof may decode the point cloud data as shown in FIG. 15.

The method/device according to the embodiments may encode and decode point cloud data based on position tree-based LoD generation in consideration of direct coded points.

As a method for efficiently compressing point cloud data and providing a service, scalable coding may be used. Scalable point cloud coding uses a LoD-based scalable layer. When direct coding as an inferred direct coding mode (IDCM) is used for position information compression, the number of nodes at a certain depth may not be equal to the number of nodes at a certain depth of an attribute.

A method according to embodiments relate to compressing and reconstructing point cloud data. Specifically, it relates to scalable attribute coding for considering various receiver environments (receiver performance, transmission performance, etc.). In this regard, the LOD generation operation according to the embodiments may match the position of a scalable layer and the number of pieces of attribute information.

The point cloud data according to the embodiments is composed of position (geometry) information (e.g., XYZ coordinates) and attribute information (e.g., color, reflectance, etc.) related to each datum. The point cloud data transmission device according to the embodiments compresses the position information and the attribute information. In compressing the position information, a method of octree-based compression is used, and then the attribute information is compressed based on the compressed data. Here, the octree used to compress the position information expresses presence/absence of a point in a partitioned space obtained by uniformly partitioning a space in which points are distributed with occupancy information about each depth.

When points are densely distributed, a higher compression efficiency may be expected than in compressing each piece of position information. As shown in part 1500 of FIG. 15, when points are distributed sparsely and/or independently, the compression effect may be reduced even if the octree-based compression technique is used. In this case, the compression efficiency and compression speed may be improved through direct coding.

FIG. 16 illustrates a point cloud data encoding and decoding procedure according to embodiments.

The transmission device 10000 of FIG. 1, the point cloud video encoder 10002, the encoding of FIG. 2, the encoder of FIG. 4, the transmission device of FIG. 12, the device of FIG. 14, the point cloud data transmission device of FIG. 16, the point cloud data transmission device of FIG. 28, or a corresponding point cloud data transmission/reception device according to embodiments that may be implemented by hardware including one or more processors or integrated circuits configured to communicate with one or more memories included in the point cloud data transmission device, software, firmware, or a combination thereof may partially encode the geometry data and/or attribute data as shown in FIG. 16.

The reception device 10004 of FIG. 1, the point cloud video decoder 10006, the decoding of FIG. 2, the decoder of FIGS. 10 and 11, the reception device of FIG. 13, the device of FIG. 14, and the point cloud data reception device of FIGS. 17 and 29, or a corresponding point cloud data transmission/reception device according to embodiments that may be implemented by hardware including one or more processors or integrated circuits configured to communicate with one or more memories included in the point cloud data transmission device, software, firmware, or a combination thereof may partially decode the geometry data and/or attribute data as shown in FIG. 16.

The G-PCC decoder 1600, 1601 may correspond to the reception device 10004 of FIG. 1, the point cloud video decoder 10006 of FIG. 1, the decoding of FIG. 2, the decoder of FIGS. 10 and 11, the reception device of FIG. 13, the device of FIG. 14, the point cloud data reception device of FIGS. 17 and 29, and the like. The G-PCC decoder represented by a block 1600 may partially decode a geometry bitstream based on the octree for the geometry data up to a specific depth based on the LOD, and partially decode an attribute bitstream through lifting-based decoding. The reconstructed point cloud data (geometry data+attribute data) may have a low resolution. The G-PCC decoder may decode the entire geometry data and attribute data as in the block 1601. The reconstructed point cloud data (geometry data+attribute data) may have a full resolution.

When the method of octree-based position compression is used, scalable coding may be supported by configuring attributes corresponding to the hierarchical structure of the octree. The scalable coding according to the embodiments refers to a method of partially encoding and/or decoding a bitstream of point cloud data up to a specific depth, rather than fully encoding and/or decoding the bitstream, as shown in FIG. 16.

For scalability, in the case of a unit node used at a specific depth of the position information tree, an occupied node including a point in a sub-node is used as a node of the depth. For attribute information, a set of attributes corresponding to each depth of the position information tree constitutes an LoD.

However, the octree structure currently used for LoD configuration may not match the geometry tree structure used for position information compression. This is because directly compressed points are not considered while assuming the octree structure.

FIG. 17 illustrates an example of a geometry node and an attribute node according to embodiments.

In performing scalable coding as shown in FIG. 16, attribute nodes may not match position nodes in a one-to-one correspondence manner for each depth, as shown in FIG. 17. That is, the scalable point cloud representation may be inaccurate.

The depths shown in FIG. 17 may represent the depths of a geometry octree and levels of attribute LOD corresponding thereto. For example, at depths from depth 0 to depth 5, the number of nodes for the attribute is equal to the number of nodes for the geometry. However, as the depth increases, the number of nodes (points) directly processed may increase due to absence of an occupied node. Accordingly, there is a difference between the number of nodes for the geometry and the number of nodes for the attribute.

In relation to the scalable attribute coding method considering direct coded points, the method/device according to the embodiments may include 1) an LoD generation method considering the position tree structure, 2) an attribute coding method considering a change in the number of position nodes according to layers when the position direct coding is used, and/or 3) constraints and signaling operations for scalable attribute coding.

In the scalable point cloud compression/reconstruction method according to embodiments, point cloud data may be compressed and reconstructed based on a position tree structure. When the inferred direct coding mode (IDCM) is used, the compression method according to the embodiments may provide an efficient and accurate scalable attribute compression method. The method according to the embodiments may be used not only to perform scalable point cloud coding, but also to adaptively provide a point cloud service in a low-latency environment. In addition, the prediction-based attribute compression method according to the embodiments may be used independently of the position compression method, and may be used not only for attribute compression but also for position compression based on the method according to the embodiments. The LoD generation method according to the embodiments may be used for general point cloud compression as well as for scalable coding applications.

Figure 18:
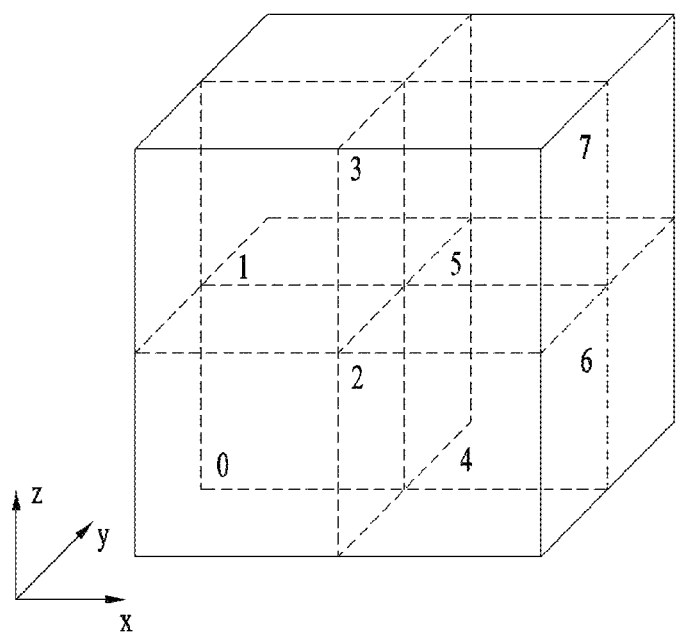
FIG. 18 illustrates an example of an octree representation of point cloud data according to embodiments.

FIG. 18 illustrates an example of an octree representation of point cloud data according to embodiments.

The transmission device 10000 of FIG. 1, the point cloud video encoder 10002, the encoding of FIG. 2, the encoder of FIG. 4, the transmission device of FIG. 12, the device of FIG. 14, the point cloud data transmission device of FIG. 16, the point cloud data transmission device of FIG. 28, or a corresponding point cloud data transmission/reception device according to embodiments that may be implemented by hardware including one or more processors or integrated circuits configured to communicate with one or more memories included in the point cloud data transmission device, software, firmware, or a combination thereof may encode the point cloud data by presenting the distribution of the point cloud data in a tree structure as shown in FIG. 18.

The reception device 10004 of FIG. 1, the point cloud video decoder 10006, the decoding of FIG. 2, the decoder of FIGS. 10 and 11, the reception device of FIG. 13, the device of FIG. 14, and the point cloud data reception device of FIGS. 17 and 29, or a corresponding point cloud data transmission/reception device according to embodiments that may be implemented by hardware including one or more processors or integrated circuits configured to communicate with one or more memories included in the point cloud data transmission device, software, firmware, or a combination thereof may decode the point cloud data by presenting the distribution of the point cloud data in a tree structure as shown in FIG. 18.

The method/device according to the embodiments may compress and reconstruct point cloud data based on the following flowchart.

S1800: IDCM-based geometry coding according to embodiments

S1801: Octree-based LoD generation according to embodiments

Each step is described below.

IDCM-Based Geometry Coding According to Embodiments

For compression of position information (geometry data) about the point cloud, an octree may be generated by equally dividing a cube into eight cubes. In this case, the process of dividing an occupied node where a point is present among the 8 nodes into 8 cubes having a length to half the length of each side of the node may be repeated, and the occupancy status of each node may be indicated as 0 or 1 using 1 bit according to the order of the nodes. That is, when a cube is divided into 8 cubes, 8 bits may be used to indicate the occupancy status of the 8 sub-nodes.

Figure 19:
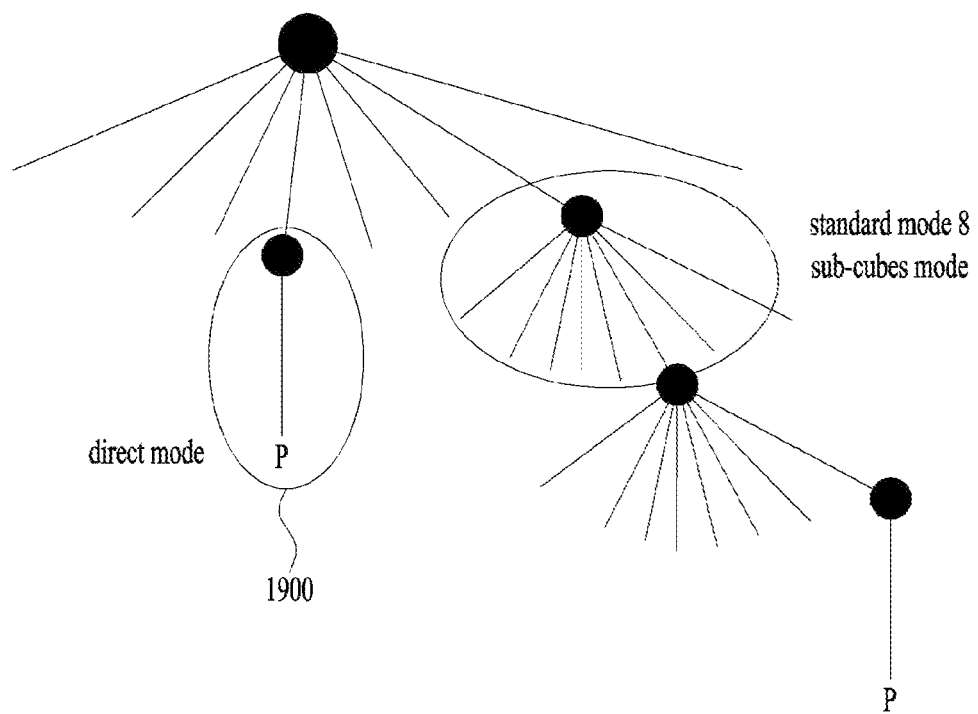
FIG. 19 illustrates an example of an octree and a direct mode according to embodiments.

FIG. 19 illustrates an example of an octree and a direct mode according to embodiments.

In the octree-based compression, the number of bits required may be reduced because the positions of points present at similar positions are expressed in a bundle. However, as shown in FIG. 19, when there is no sibling node among descendent nodes of the occupied node (1900), the octree-based compression may not achieve a great effect. Accordingly, in this case, improvement of coding efficiency and compression speed may be expected by performing direct coding in the direct mode 1900.

The current point (node) may have up to 8 child nodes, which may include an occupied node and/or unoccupied nodes.

When there are no child nodes and/or sibling nodes, there is a high probability that similar neighbor points are present. Accordingly, there may be no duplicate data in the neighbor even when a predicted value between nodes (points) is generated and a residual is generated. The data in the neighbor may not be similar, the accuracy may be low, or a latency may occur. In this case, as shown in 1900, the corresponding point may be directly coded and the position value of the point may be directly transmitted.

To determine whether to the direct coding according to the embodiments is to be performed, the method/device according to the embodiments may use a relationship with a neighbor node as a criterion for the determination as follows.

1) The current node (point) is the only occupied child of the parent node, and the grand-parent has at most one occupied child (i.e., occupied sibling of the parent);
2) The current node is the only occupied child of the parent node, and the current node, and 6 neighbors (nodes whose faces are in contact with the node) are not occupied;
3) Inter-point prediction is expected to have low coding efficiency.

For example, in these case, it may be determined that direct coding is eligible, and the inferred direct coding mode (IDCM) may be applied only when the number of included points is less than or equal to a threshold according to embodiments. When the IDCM is performed, a flag indicating that IDCM is performed, the number of points, and information indicating the XYZ values of the point position (a portion corresponding to the remaining depth at which octree coding is not performed) may be included in the bitstream as parameter information and delivered to the receiving-side decoding.

FIG. 20 is a flowchart illustrating direct coding according to embodiments.

The transmission device 10000 of FIG. 1, the point cloud video encoder 10002, the encoding of FIG. 2, the encoder of FIG. 4, the transmission device of FIG. 12, the device of FIG. 14, the point cloud data transmission device of FIG. 16, the point cloud data transmission device of FIG. 28, or a corresponding point cloud data transmission/reception device according to embodiments that may be implemented by hardware including one or more processors or integrated circuits configured to communicate with one or more memories included in the point cloud data transmission device, software, firmware, or a combination thereof may encode the point cloud data based on the flowchart as shown in FIG. 20.

The reception device 10004 of FIG. 1, the point cloud video decoder 10006, the decoding of FIG. 2, the decoder of FIGS. 10 and 11, the reception device of FIG. 13, the device of FIG. 14, and the point cloud data reception device of FIGS. 17 and 29, or a corresponding point cloud data transmission/reception device according to embodiments that may be implemented by hardware including one or more processors or integrated circuits configured to communicate with one or more memories included in the point cloud data transmission device, software, firmware, or a combination thereof may decode the point cloud data based on the flowchart shown in FIG. 20.

For example, the parent node 2000 may have a maximum of 8 children according to the distribution of points, and a specific child 2001 may have more children. At the corresponding point 2002, it may be determined whether to further perform octree splitting and perform predictive coding or direct mode coding.

When the direct mode is eligible (2003), the direct mode may be enabled if the number of neighbor nodes (neighbor points) for the point is less than or equal to a threshold th. The x, y, z coordinate information indicating the position values of each of one or more points may be processed through direct coding. The position values may be expressed based on the sub-cube for the octree.

When the number of neighbor nodes (neighbor points) is greater than the threshold, predictive coding may exhibit higher compression efficiency than direct coding, and therefore direct mode may be disabled and the node may be further split to generate an octree.

When the direct mode is not eligible (2004), the node may be further split into octree-based sub-cubes based on the corresponding point.

Octree-Based LoD Generation According to Embodiments

Referring to FIG. 9, the method/device according to the embodiments may perform attribute coding based on an LOD generated through LoD generation. LoD is an abbreviation of Level of Detail. Each LoD is configured such that the density of points increases as the LoD increases. In this regard, it is determined whether a point is included in LoD k based on the distance from a neighbor point.

The attribute encoder of the transmission device 10000 of FIG. 1, the point cloud video encoder 10002, the encoding of FIG. 2, the encoder of FIG. 4, the transmission device of FIG. 12, the device of FIG. 14, the point cloud data transmission device of FIG. 16, the point cloud data transmission device of FIG. 28, or a corresponding point cloud data transmission/reception device according to embodiments that may be implemented by hardware including one or more processors or integrated circuits configured to communicate with one or more memories included in the point cloud data transmission device, software, firmware, or a combination thereof may generate an LOD, classify points according to an LOD level, and perform attribute predictive coding or lifting coding based on the LOD. Furthermore, it may perform scalable attribute coding.

The reception device 10004 of FIG. 1, the point cloud video decoder 10006, the decoding of FIG. 2, the decoder of FIGS. 10 and 11, the reception device of FIG. 13, the device of FIG. 14, and the point cloud data reception device of FIGS. 17 and 29, or a corresponding point cloud data transmission/reception device according to embodiments that may be implemented by hardware including one or more processors or integrated circuits configured to communicate with one or more memories included in the point cloud data transmission device, software, firmware, or a combination thereof may generate an LOD, classify points according to an LOD level, and perform attribute prediction decoding or lifting decoding based on the LOD. Furthermore, it may perform scalable attribute decoding.

FIG. 21 illustrates an example of scalable attribute coding according to embodiments.

The scalable attribute coding as shown in FIG. 16 is based on the fact that the resolution increases according to the depth of the octree-based geometry coding. That is, as partitioning that builds a parent/child tree structure by increasing the depth of the octree is applied, the detail of the tree increases. Point cloud data may be scalably represented by matching an attribute to an occupied node where points are present at each depth.

For such scalability, in the scalable attribute coding, octree-based LoD generation may be performed and a neighbor point (attribute) may be selected according to a unit node rather than a distance. In this case, children having the same node as a parent may be defined as neighbors, and one attribute may be selected within the neighbors and matched to the parent node.

For scalability, point cloud data corresponding to an octree of a specific depth and/or an LOD of a specific level may be encoded and/or decoded.

Referring to FIG. 21, for example, a node (point) 2100 may be present at the i-th level (depth). The node 2100 may include three nodes (points) 2101 as children. When the parent 2100 and the children 2101 are present, an attribute of a specific child among the children may be matched to the attribute of the parent. For example, the attribute of the first child in order among the three children may be set as the attribute of the parent. A node (point) whose attribute is used as the attribute of an upper node may be referred to as a reference node or a retained node. Children belonging to one parent are most likely to have an attribute similar to that of the parent. The process of configuring the reference node or the retained node may be referred to as sampling or sub-sampling.

In FIG. 21, the colored occupied nodes may be reference nodes. The LOD level may range from a root to a leaf, and an LOD boundary corresponding to a specific depth and aligned with an octree may be present. Based on the geometry data reconstructed by the geometry encoder/decoder according to the embodiments, the attribute encoder/decoder according to the embodiments may sort the points in Morton code order and represent the points in a tree structure according to the LOD.

In addition, outputting a middle layer scalably based on the hierarchical structure of the point cloud data is called scalable representation.

As shown in FIG. 21, scalable representation may be performed based on the reference node whose attribute is selected as the attribute of the parent node.

An octree representing the geometry data may be partially processed, and attribute data corresponding to the geometry data may be partially decoded based on the scalable representation.

For encoding and decoding of the point cloud data, the hierarchical structure of geometry and the hierarchical structure of attributes must match to each other. Accordingly, the method/device according to the embodiments may compare nodes between geometry and attributes as follows.

Comparison Between Geometry Nodes/Attribute Nodes

Compressed position information according to embodiments may be divided into octree-based compressed points and point compressed through IDCM. However, in the scalable attribute coding, subsampling is performed on the assumption that there is a full octree without considering the IDCM in generating LoD, and therefore there may be a difference in the number of nodes at each depth (see FIGS. 21 to 24).

FIG. 22 illustrates a hierarchical structure of point cloud data according to embodiments.

FIG. 22 illustrates a case where a method/device according to embodiments compresses a position (geometry data) using the IDCM and compresses attributes (attribute data) based on the full octree.

This figure compares the number of nodes for the geometry with that for the attributes at each depth. A node at each depth corresponds to a circle defined by a solid line, and a dotted circle corresponds to an IDCM applied node.

For example, in Depth 2, it may be seen that the IDCM has been performed on the first node.

The number of nodes at each depth may be expressed as shown in FIG. 22. The number of nodes generated by partitioning of the octree and the number of points generated by the IDCM are shown. That is, at depth 2, there may be two occupied nodes, and two points generated through the IDCM. However, it may be seen that the number of LoD nodes at the same depth is three, because subsampling is performed based on the occupied nodes at the depth in an environment with a full octree without considering the IDCM. A child most similar to the parent is subsampled while shifting from the leaf node to the root node and the attribute thereof is considered as the attribute of the parent. Accordingly, if the IDCM is not considered in the full octree-based subsampling, the number of nodes (points) may differ between the depth and LOD.

In FIG. 22, when subsampling is applied based on the full octree regardless of the IDCM-applied node, 3 nodes are present at LOD2, 5 nodes are present at LOD3, and 9 nodes are present at LOD4.

At Depth 1, the number of occupied nodes is 2, the number of direct-coded nodes is 0, and LOD1 has 2 nodes. Accordingly, the geometry nodes and the attribute nodes correspond to each other.

At Depth 2, the number of occupied nodes is 2, the number of direct-coded nodes is 2, and LOD2 has 3 nodes. Accordingly, there is a discrepancy between the geometry nodes and the attribute nodes.

When the set of position nodes for the n-th depth is defined as Geom(n) and the set of LoD points corresponding to the n-th depth is defined as LoD(n), the sets may be defined as follows.

Geom($n$)={occupied nodes at depth $n$}+{direct coded points at depth $n$}

LoD($n$)={occupied nodes at depth $n$}

For the n-th depth, the set of position nodes is the sum of the number of occupied nodes at depth n and the number of direct coded points at depth n.

The set of LoD points corresponding by the n-th depth is the occupied nodes at depth n.

When the position and attributes at depth 2 are output (decoded) by the scalable representation, one point may be output without attributes because the number of geometry nodes is 4 while the number of attribute nodes is 3. In this case, the data representation may be poor because a point has both a position (geometry data) and attributes (attribute data).

In addition, when there are three matching points, they may be matched to positions different from the actual positions of the nodes. For example, when nine points are present in the leaf node and the attributes of the leaf node are defined as a, b, c, d, e, f, g, h, and i, the position-attribute matching according to the layer (LOD level or depth) considered in scalable attribute coding is configured as shown in FIG. 23.

FIG. 23 shows an example of attribute data according to embodiments.

In order to encode point cloud data, for example, attribute data, the method/device according to the embodiments may present the data in a tree structure based on the LOD and the Morton code of the geometry and perform scalable subsampling by selecting a child node most similar to the parent while moving from the leaf node 2300 to the root node and selecting the attribute value of the parent.

When the attributes of the leaf node are a, b, c, d, e, f, g, h, and i, the attributes of the parents for a and b may be sampled as a and b because each parent has one child. For the parent having c and d as children, attribute c of a child, which is a similar attribute, may be sampled as the attribute of the parent. Similarly, attributes e and g may be sampled. For each node up to the root node, the attribute of a child may be sampled as the attribute of the parent of the child.

Figure 24:
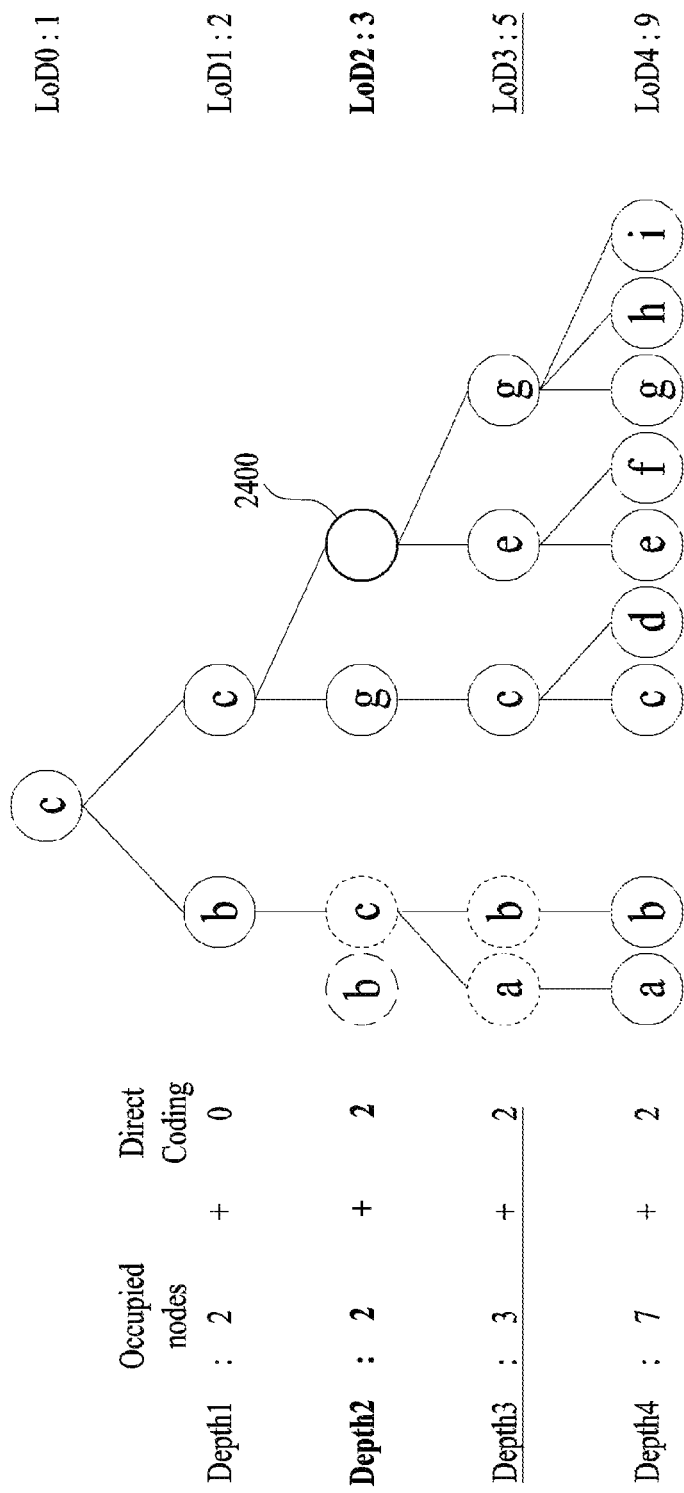
FIG. 24 shows an example of attribute data according to embodiments.

FIG. 24 shows an example of attribute data according to embodiments.

In comparison with FIG. 23, when geometry coding is performed in consideration of the IDCM, the number of decoded nodes (4 at depth 2) is different from the number of LoD nodes (3 at level 2). In the case where a position and attributes of a node are matched without considering the aforementioned difference, the position may not be matched to the attributes as shown in FIG. 24 (b, c, and g are matched to the positions a, b, and c), or a case where the position is not matched to attributes (2400) may occur. The number of decoded nodes (geometries) is 4, but the number of LoDs (attributes) therefor is 3. Accordingly, 3 attribute values may be matched to wrong positions.

That is, an error occurs in the scalable representation. In an example of according to the embodiments, it is assumed that the IDCM is determined at depth 1 and a direct coded node is transmitted, starting at depth 2.

Method for Matching Position Tree Structure to Attribute LoD Structure

As a method for addressing the issue of mismatch the position information and the attribute information at each depth, the method/device according to the embodiments proposes the following two methods. The two methods may be selectively carried out or may be carried out in combination: (1) LOD oriented geometry tree generation and (2) Geometry tree oriented LoD generation.

Scalability may be provided based on an octree-based layer structure assumed for the attributes. When scalable coding is performed, compression may be performed in consideration of the LoD structure. In contrast, LoD may be configured based on the position structure. In this case, octree nodes and IDCM points constitute a scalable layer at each depth, and LoD may be configured accordingly.

LoD Oriented Geometry Tree Generation

In the LoD generation used in scalable attribute coding, the attribute of a node corresponding to an upper layer is selected from among child nodes on the assumption that a full octree is configured. When such an LoD configuration is considered in position compression, only the octree (or a tree structure corresponding thereto) may be used except for the IDCM. To this end, the attribute LoD structure may be matched to the position tree structure by adding the following constraint.

Constraint: When scalable attribute coding is used, the IDCM is not used in position compression.

Figure 25:
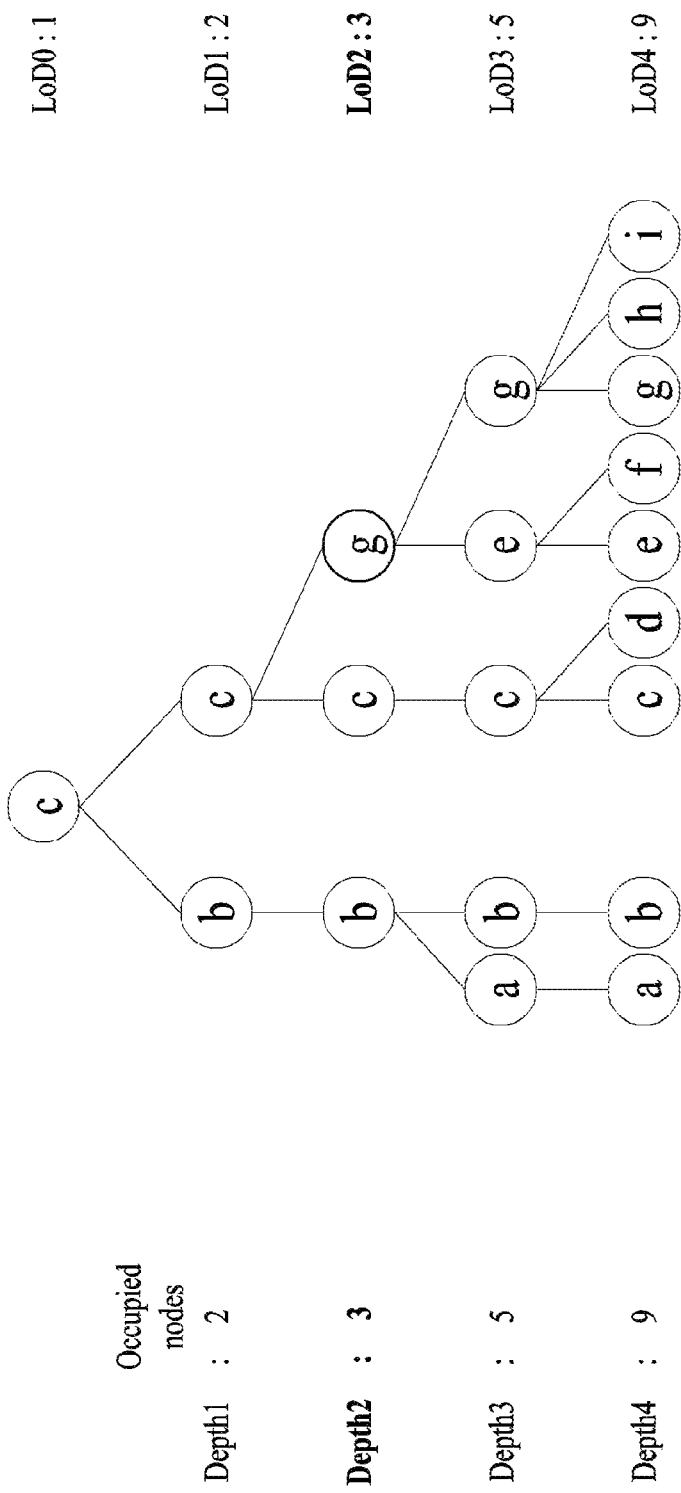
FIG. 25 illustrates a geometry tree according to embodiments.

FIG. 25 illustrates a geometry tree according to embodiments.

FIG. 25 illustrates a case where a position tree structure is generated based on constraints according to embodiments. That is, a position tree structure which is the same as the LoD layer structure may be generated.

At each depth, position nodes and attributes may be matched as shown in FIG. 25. It may be seen that a position and an attribute are matched in a one-to-one correspondence manner for each depth. That is, the position and attributes may be matched by blocking the generation of a set of direct coded points in Geom(n) as shown below.

Geom(n)={occupied nodes at depth n}<+{direct coded points at depth n},delete>

LoD(n)={occupied nodes at depth n}

Geometry Tree Oriented LoD Generation

The method/device according to the embodiments may generate LoD based on the position tree structure. In this case, a method of adding an IDCM node to each depth in contrast with the LoD generation method may be considered. That is, the method/device according to the embodiments may receive occupied nodes and direct coded nodes constituting the position tree structure separately, and then generate an LOD by separating the occupied nodes and the direct coded nodes. In the relationships shown below, LoD'(n) may be composed of points compressed according to the IDCM at the n-th depth and occupied node excluding IDCM at the n-th depth of the position tree structure.

Geom(n)={occupied nodes at depth n}+{direct coded points at depth n}

LoD'(n)={occupied nodes at depth n}+{direct coded points at depth n}

When a set of occupied nodes for depth n is occupancy(n), a set of nodes direct coded using a method such as the IDCM is occupancy_direct(n), and a set of nodes compressed by the tree structure rather than direct coding is occupancy_tree (n), the following relationship may be established.

occupancy(n)=occupancy_tree(n)+occupancy_direct(n)

In addition, when direct coding is performed, a set of points may be defined as DIRECT, and direct_point_set(n), the set of direct coded points at depth n, may be defined as follows.

When a node for depth n having a point p as a descendant is defined as NODE(p, n), NODE(p, n) belongs to occupancy_direct(n) and does not belong to occupancy_tree(n). Here, NODE(p, n) may be obtained as follows (In the equation below, << and >> mean bit left shift and bit right shift).

position of NODE(p,n)=(position of p>>n)<<n)

The position may be adjusted by shifting the position of the point.

A node size, which is a sampling unit, may vary according to an octree depth, and a position of a node (point) may be determined through a shift operation in consideration of the node size. For example, a node (point) may be shifted between octree depths.

According to embodiments, the shift operation may be implemented as follows.

position of NODE(p,n)=(position of p>>(N−n))<< (N−n)

Figure 26:
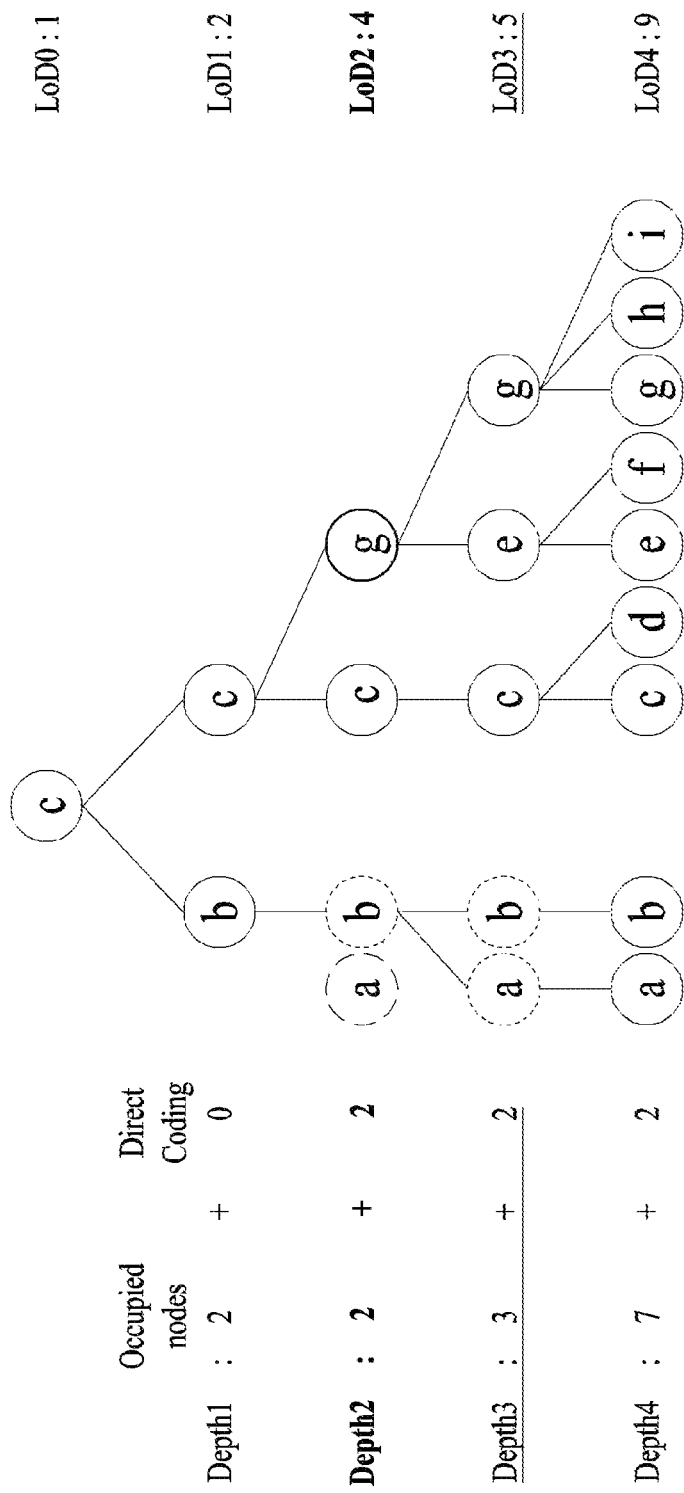
FIG. 26 illustrates a scalable representation according to embodiments.

Referring to FIG. 26, the nodes of the tree may be configured by shifting the position of the node to depths 2 to 4 for a and b, which are IDCM-applied points.

Based on the above relationship, LoD'(n) may be generated as follows.

Starting from n=N(maximum depth)

LOD is generated from the maximum depth N.
1) Perform scalable LOD subsampling based on the position tree structure that may be generated through occupancy_tree(n). That is, one of the nodes belonging to the same parent is selected (sampled) from among the nodes belonging to occupancy_tree(n), and occupancy_tree(n−1) is generated. Since direct coding is not applied to the nodes, scalable LOD subsampling is eligible.
2) For point p belonging to DIRECT, a set of direct coded points, points belonging to occupancy_direct(n) are selected and configured as direct_point_set(n).

For example, in FIG. 26, since there are two IDCM points, the set of the two point belongs to occupancy_direct(n), and direct_point_set(n) is generated with these points.
3) Configure LoD'(n) as shown below.

LoD'(n)=occupancy_tree(n)+direct_point_set(n)

For example, since there are 2 IDCM points and 2 LODs, the value of the adjusted LOD is 4.

In this case, the order of nodes or points conforms to the position compression order (decoding order). In other words, when occupancy information about the tree structure is delivered first and then direct coded point information is delivered in position compression, direct coded point information may be delivered after occupied node information is delivered even in configuring LoD. Thereby, the position and attributes may be matched in order in scalable representation. Alternatively, by signaling information on the delivery order, the receiver may be allowed to match the points according to the correct order.
4) Include NODE(p, n−1) in occupancy_tree(n−1) for a point p that does not belong to occupancy_direct(n−1) among the points belonging to direct_point_set(n), and set n=n−1.

For example, in FIG. 26, at depth 3 (n=3), LOD3 level has a and b. At depth 2 and lod2 level, a does not belong to the IDCM set at depth 2, which is depth n−1, and lod2. Accordingly, a may be included in depth 2.

The above process may be repeated until the root node is reached.

According to this method, geometry and attributes may be matched in the tree structure as shown in FIG. 26.

FIG. 26 illustrates a scalable representation according to embodiments.

FIG. 26 shows the results of matching between position nodes and attributes at each depth when the attribute LoD structure is generated based on the proposed position tree structure (namely, the LoD is generated in consideration of the IDCM). For example, at depth 2, positions and attributes may be matched in a one-to-one correspondence manner by generating LoD2 including points a and b compressed through the IDCM and points c and g compressed through a tree structure. That is, positions and attributes may be matched in a one-to-one correspondence manner in scalable representation by generating an LoD in consideration of the set of direct coded points generated in Geom(n) and the position tree structure changed through the set as disclosed below.

Scalable Representation

In order to match attributes to positions of points, the method/device according to the embodiments may configure the positions of the points as follows.
1) For scalable representation, a direct coded point may represent the position of an actual point. For a geometry tree-based node, a point may be represented using an attribute matched to the representative position (e.g., center position) of the node.
2) Alternatively, when the representative position of the node NODE(p, n) corresponding to depth n is used as a position value for a direct coded point, and there are multiple points, each attribute may be matched to the points as duplicated points.

3) Alternatively, when the representative position of the node NODE(p, n) corresponding to depth n is used as a position value for a direct coded point, and there are multiple points, multiple attributes may be combined into one representative attribute through a method such as averaging and matched.

The point cloud data transmission method/device (10000, 10002, or 20001 in FIG. 4, 12, or 14) according to the embodiments may encode point cloud data and generate a bitstream containing the point cloud data and parameter information related to the point cloud data.

Information related to LoD generation according to embodiments used in the encoding operation may be included in a parameter set and an attribute slice header as follows.

According to embodiments, a it may be defined at a corresponding position or a separate position in the bitstream according to the application and system, such that the scope of application and the method of application may be used differently.

An attribute parameter set and an attribute slice header according to embodiments may include encoding-related information. Furthermore, the information may be included in a geometry parameter set and a geometry slice header in the bitstream so as to be associated with a geometry coding method or applied to geometry coding, or may be included in a sequence parameter set, a tile parameter set, or the like.

In addition, when the syntax element of FIG. is applicable not only to the current point cloud data stream but also to a plurality of point cloud data streams, the encoding-related information according to the embodiments may be carried in a higher-level parameter set or the like.

The signaling information according to the embodiments may be generated in the compression (encoding) operation of the prediction-based scalable point cloud compression transmission device/method, and may be used in the decoding operation of the prediction-based scalable point cloud compression reception device/method.

Parameters (which may be referred to as various terms such as metadata and signaling information) according to embodiments may be generated in a process of a transmitter according to embodiments, and may be transmitted to a receiver according to the embodiments so as to be used in an operation of reconstructing the point cloud data. For example, the parameters according to the embodiments may be generated by the metadata processor (or metadata generator) of the transmission device according to the embodiments and acquired by the metadata parser of the reception device according to the embodiments.

FIG. 27 shows an attribute parameter set according to embodiments.

Constrained_IDCM_flag equal to 1 may indicate that there is a constraint in generating a tree structure. Here, the constraint may be a condition for scalable attribute coding, and may indicate that IDCM is not used for geometry coding. The flag equal to 1 may be used to indicate that the receiver can use geometry tree-based LoD generation. Constrained_IDCM_flag equal to 0 may be used to indicate that the receiver should perform LoD generation in consideration of a direct coded point. According to embodiments, the flag may be referred to as a constraint flag or the like.

For example, in performing scalable attribute coding based on a geometry tree corresponding to the LOD layer structure without the IDCM as shown in FIG. 25, the method/device according to the embodiments may inform the receiver of whether the coding is performed through a flag.

direct_coded_point_considered_LoD_generation_enable_flag equal to 1 may indicate that LoD generation considering direct coding used in position compression is used. The flag equal to 0 may indicate that LoD generation is used using only the geometry tree structure without considering direct coding.

occupied_node_first_flag equal to 1 may indicate that attribute information matched to a tree-based occupied node is delivered first. The flag equal to 0 may indicate that information related to a direct coded point is transmitted first.

direct_coded_point_considered_LoD_generation_enable_flag equal to 1 may indicate a case where scalable attribute coding is performed by generating an IDCM-based LOD. When this flag is 1, the point cloud data reception method/device according to the embodiments may check whether the information received based on the first flag is attribute data matched to an LOD node or an IDCM applied point, check the correspondence/matching relationship between the geometry nodes and the attribute nodes, and accurately reconstruct the attributes corresponding to the position.

When direct_coded_point_considered_LoD_generation_enable_flag is 0, scalable attribute coding may be performed for the depth (level) at which the geometry tree and the LOD are matched.

num_scalable_levels: may indicate the number of levels at which scalable representation is feasible when LoD generation is not considered even when direct coding is used in position compression. num_scalable_levels may indicate the number of levels at which geometry depths are matched to LoDs.

matched_depth_index: may indicate a depth at which the number of geometry nodes (including idcm points) is equal to the number of attributes belonging to LoD. According to embodiments, there may or may not be a level (depth) at which geometry nodes are matched to attribute nodes for multiple scalable levels.

FIG. 28 illustrates attribute encoding of point cloud data according to embodiments.

Figure 30:
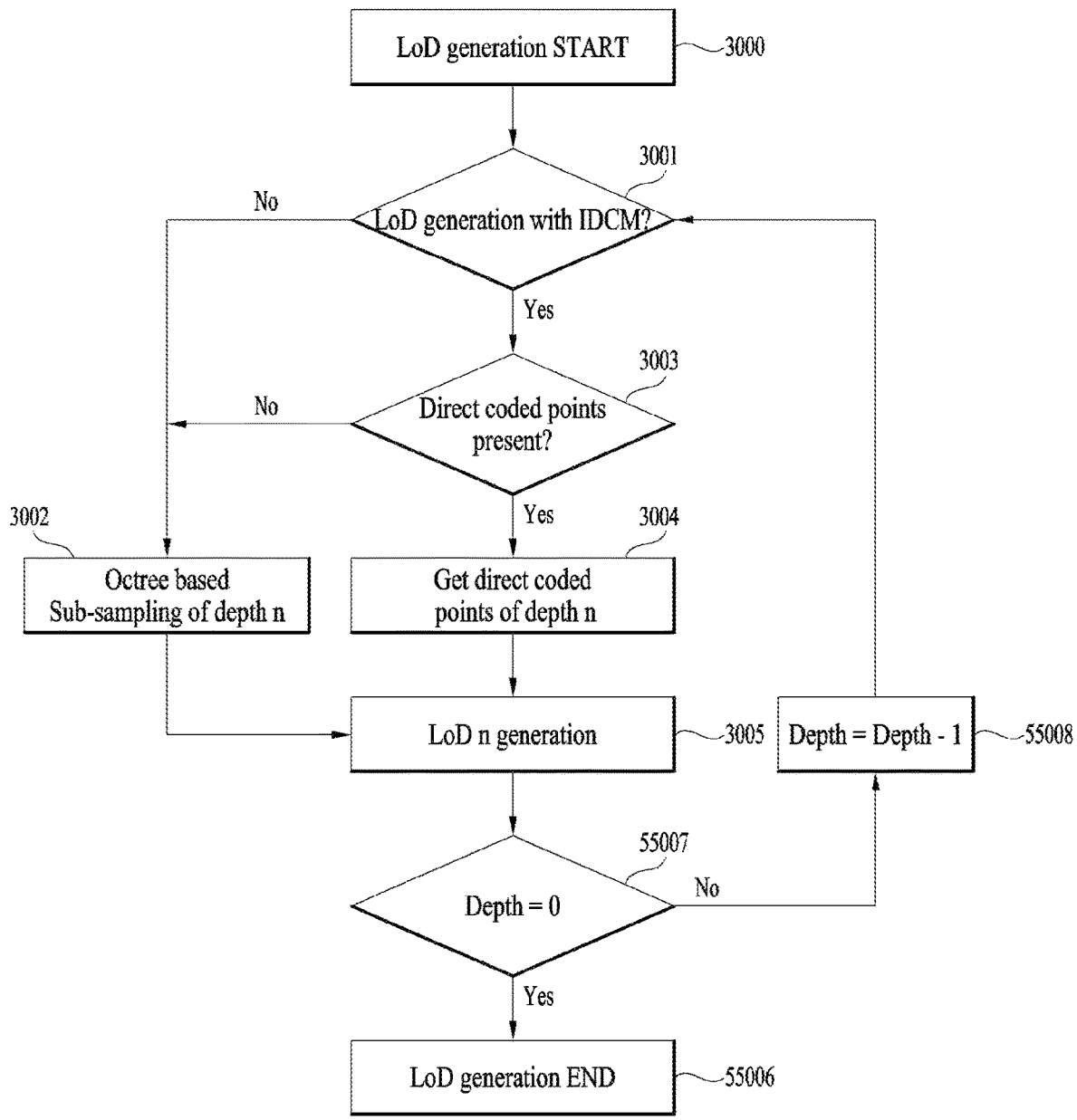
FIG. 30 illustrates LOD generation according to embodiments.

FIG. 28 illustrates a point cloud data transmission device or attribute encoder included in or corresponding to the point cloud video encoder 10002 of FIG. 1, the encoding 20001 of FIG. 2, the encoder of FIG. 4, the transmission device of FIG. 12, the XR device 1730 of FIG. 14, a processor configured to perform the operations of FIGS. 15 to 26, a processor configured to generate the bitstream of FIG. 27, a processor configured to perform the operations of FIG. 30, or the like. Each component of FIG. 28 may be implemented by hardware including one or more processors or integrated circuits configured to communicate with one or more memories, software, firmware, or a combination thereof.

The LOD generator 2800 may receive attribute data. In order to encode the attribute data, information about a geometry tree structure and/or direct coded nodes may be received. The generator 2800 may generate an LOD tree structure having layers.

The prediction & residual estimator 2801 may generate a prediction for a current point based on the LODs, and generate a residual between an attribute value of the current point and a predicted attribute value.

The attribute transformer 2802 may apply a transform to the residual based on a compression domain.

The quantizer 2803 may quantize the attribute data. The attribute data may be quantized based on a quantization parameter.

The point cloud data transmission device according to the embodiments may entropy-code the attribute data.

The LoD generator 2800 according to the embodiments may perform LoD generation based on a geometry tree structure and a direct coded point, and may perform sub-sampling in the LoD generation such that positions and attributes are matched in a one-to-one correspondence manner in consideration of the geometry tree structure and the direct coded point.

Through the tree-based sub-sampling, the method/device according to the embodiments may perform scalable coding. The point cloud data may be scalably encoded and reconstructed.

In this case, the order in which information is transmitted may be transmitted through occupied_node_first_flag in order to accurately match the positions and the attributes. In the case where the LoD is generated without considering the geometry structure, information about the depth where the positions and the attributes are matched may be generated and delivered by matched_depth matched to num_scalable_levels for the scalable representation.

FIG. 29 illustrates attribute decoding of point cloud data according to embodiments.

FIG. 29 shows a receiving-side structure corresponding to FIG. 28.

FIG. 29 may represent a processor corresponding to the point cloud video decoder 10006 of FIG. 1, the decoding 20003 of FIG. 2, the decoder of FIGS. 10 and 11, the receiving device of FIG. 13, the XR device 1730 of FIG. 14, the reconstruction of point cloud data according to FIGS. 15 to 26, use of the parameter information of FIG. 27, a reverse process of FIG. 28, or the like. Each component of FIG. 29 may be implemented by hardware including one or more processors or integrated circuits configured to communicate with one or more memories, software, firmware, or a combination thereof.

The dequantizer 2900 may receive an encoded attribute bitstream from a transmission device. Attribute data may be reconstructed by performing dequantization corresponding to the quantizer on the receiving side.

The inverse transformer 2901 may reconstruct the attribute data by inverse transform on the receiving side.

The LOD generator 2902 may generate an LODs for attribute decoding. LODs may be generated in a similar manner to the operation on the transmitting side. The LOD generator may generate the LODs based on a geometry tree structure and/or a direct coded node.

The attribute reconstructor 2903 may reconstruct the attribute data based on the LODs.

The receiving side reconstructs the signal in reverse order of the operations on the transmitting side. After entropy decoding of the received bitstream, inverse quantization, and inverse transform are performed, and the attribute reconstruction is performed. In this operation, attributes are reconstructed based on the LoD information generated based on the geometry tree structure.

The receiver may use signaling information contained in the bitstream. Different LoD generations may be used based on constrained_IDCM_flag. When constrained_IDCM_flag is 1, the receiver may recognize that the direct coding mode is not used and may perform geometry tree-based LoD generation, and all depths are eligible scalable representation.

When constrained_QTBT_flag contained in the bitstream is 0 (i.e., the tree structures QT and BT are not used), two cases may occur. When direct_coded_point_considered_LoD_generation_enable_flag is 1, LoD generation may be performed in consideration of the geometry tree and direct coded point. That is, when LoD generation is performed, subsampled nodes and direct coded points according to the geometry tree may be included in the LoD.

When direct_coded_point_considered_LoD_generation_enable_flag is 0, the direct coded point may not be considered. Instead, the depth that is eligible for the scalable representation may be identified through matched_depth_index, and may be used for the scalable representation.

FIG. 30 illustrates LOD generation according to embodiments.

FIG. 30 is a flowchart illustrating the LOD generation of FIGS. 29 and/or FIG. 30.

3000: Start LOD generation. For LOD generation, point cloud data (geometry data and attribute data), geometry structure information (tree), and depth information (N) may be provided.

3001, Determine whether to consider IDCM in performing LOD generation. When the IDCM is not considered, octree-based sub-sampling is performed at depth N (3002). Since there are no IDCM points, the geometry octree and LOD layers may be matched to each other to perform scalable sub-sampling LOD generation. An LOD having layer (level) N may be generated (3005). The operation ends when all LODs are generated from the leaf node (N) to the root node (depth 0).

3003: When the IDCM is considered in performing the LOD generation, it is determined whether there is IDCM point information. When the IDCM point information is not present, octree-based sub-sampling is performed at depth N.

3004: When the IDCM point information is present, an LOD is generated at depth N by acquiring direct coded points (3005).

The method/device according to the embodiments may encode and decode point cloud data based on a flowchart for LoD generation in consideration of a geometry tree and direct coding. FIG. 30 assumes that constrained_IDCM_flag=0. When constrained_IDCM_flag=1, the existing LoD generation may be used.

When constrained_IDCM_flag=0 and direct_coded_point_considered_LoD_generation_enable_flag is 1, the LoD generation consideration of the geometry tree and direct coding may be used.

When IDCM applied points, that is, direct coded points, direct_point_set (n), a set of points corresponding to the current depth among the direct coded points may be configured, and occupancy_tree(n), a set of occupied nodes, may be obtained based on the geometry tree structure to configure LoD(n). For example, the LOD may be configured as occupancy(n)=occupancy_tree(n)+occupancy_direct(n).

Figure 31:
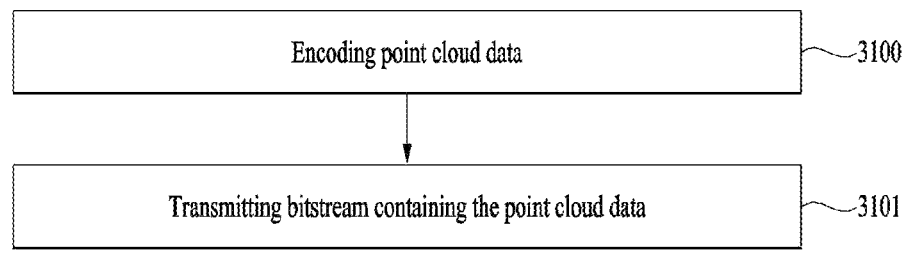
FIG. 31 illustrates a point cloud data transmission method according to embodiments.

FIG. 31 illustrates a point cloud data transmission method according to embodiments.

3100: The method of transmitting point cloud data according to the embodiments may include encoding point cloud data. The encoding operation according to the embodiments may correspond to or include the operations of the point cloud video encoder 10002 of FIG. 1, the encoding 20001 of FIG. 2, the encoder of FIG. 4, the transmitting device of FIG. 12, the XR device 1730 of FIG. 14, the encoding of the point cloud data of FIGS. 15 to 26, the generation of a bitstream containing parameter information of FIG. 27, the attribute encoding of FIG. 28, and the LOD generation of FIG. 30.

3101: The method for transmitting point cloud data according to the embodiments may further include transmitting a bitstream containing the point cloud data. The transmission operation may correspond to or include the operations of the transmitter 10003 of FIG. 1, the transmission 20002 of FIG. 2, the generation and transmission of the bitstream of FIG. 4, and the transmission of the bitstream containing the point cloud data of FIG. 12.

Figure 32:
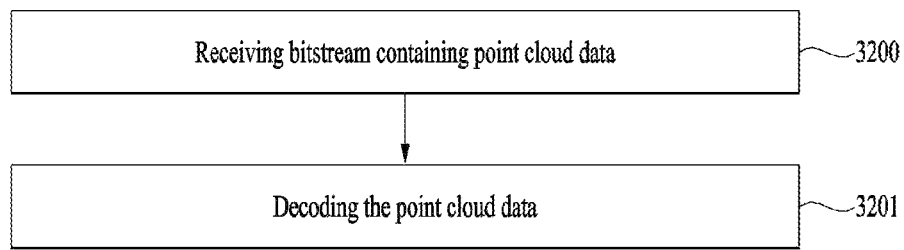
FIG. 32 illustrates a point cloud data reception method according to embodiments.

FIG. 32 illustrates a point cloud data reception method according to embodiments.

3200: The method of receiving point cloud data according to the embodiments may include receiving a bitstream containing point cloud data. The reception operation may correspond to or include the operations of the receiver 10005 of FIG. 1, the transmission-reception 20002 of FIG. 2, the reception of the bitstream containing geometry data and attribute data of FIGS. 10 and 11, the reception of the bitstream containing the point cloud data of FIG. 13, and the reception of the bitstream containing the parameter information of FIG. 27.

3201: The point cloud data reception method according to the embodiments may further include decoding the point cloud data. The decoding operation may correspond to or include the operations of the point cloud video decoder 10006 of FIG. 1, the decoding 20003 of FIG. 2, the decoder of FIGS. 10 and 11, the reception device of FIG. 13, the XR device 1730 of FIG. 14, the decoding of the point cloud data of FIGS. 25 and 26, the attribute decoding of FIG. 29, and the LOD generation of FIG. 30.

A method of transmitting point cloud data according to embodiments may include encoding point cloud data; and transmitting a bitstream containing the point cloud data (see FIG. 1 and the like).

The encoding of the point cloud data according to the embodiments may include encoding geometry data of the point cloud data and encoding attribute data of the point cloud data. The encoding of the attribute data may include generating a level of detail (LOD) (see FIG. 28 and the like).

In the generating of the LOD according to the embodiments, based on direct coding mode-applied point cloud data not being present, the LOD may be generated based on an octree for the point cloud data (see FIGS. 28 to 30 and the like).

Based on direct coding mode-applied point cloud data being present (e.g., constrained_IDCM_flag=1), the generating of the LOD according to the embodiments may generate a node of a depth of the LOD based on information about the direct coding mode-applied point cloud data of the depth of the LOD (see FIGS. 28 to 30 and the like).

Based on direct coding mode-applied point cloud data being present (e.g., constrained_IDCM_flag=0), the generating of the LOD according to the embodiments may include matching a node for the geometry data to a node for the attribute data without information about the direct coding mode-applied point cloud data of the depth of the LOD. In this regard, matched_depth_index may be generated for every num_scalable_levels.

The bitstream according to the embodiments may contain parameter information related to the point cloud data (see FIG. 27 and the like).

A method of receiving point cloud data according to embodiments may include: receiving a bitstream containing point cloud data; and decoding the point cloud data (see FIG. 1 and the like).

The decoding of the point cloud data according to the embodiments may include decoding geometry data of the point cloud data and decoding attribute data of the point cloud data (see FIG. 28 and the like).

The decoding of the attribute data according to the embodiments may include generating a level of detail (LOD) for the point cloud data (see FIGS. 28 and 30 and the like).

Based on direct coding mode-applied point cloud data not being present (e.g., constrained_IDCM_flag=1), the generating of the LOD according to the embodiments may include generating the LOD based on an octree for the point cloud data (see FIGS. 28 and 30 and the like).

Based on direct coding mode-applied point cloud data being present (e.g., constrained_IDCM_flag=0), the generating of the LOD according to the embodiments may include generating a node of a depth of the LOD based on information about the direct coding mode-applied point cloud data of the depth of the LOD (see FIGS. 28 and 30 and the like).

Based on direct coding mode-applied point cloud data being present, the generating of the LOD according to the embodiments may include matching a node for the geometry data to a node for the attribute data without information about the direct coding mode-applied point cloud data (e.g., constrained_IDCM_flag=0 & matched_depth_index). matched_depth_index may indicate the matched index for each level.

The bitstream according to the embodiments may contain parameter information related to the point cloud data (see FIG. 27 and the like).

Attribute compression according to embodiments is performed after position information coding is completed, and attribute coding is performed independently of a tree structure used for the position compression. In this case, when some coding tree levels are skipped for position information, attribute coding should be performed based on partial position information. However, the method/device according to the embodiments may address this issue of the mismatch between the reconstructed partial position points and the entire reconstructed attribute points by performing compression based on the entire coding tree levels.

As a scalable attribute coding method in consideration of a direct coded point used for position compression, the method/device according to the embodiments may provide 1) an LoD generation method considering a position tree structure and/or 2) an attribute coding method in consideration of a change in the number of position nodes according to layers when direct coding of positions is used, and 3) constraints and signaling for scalable attribute coding.

The method/device according to the embodiments may efficiently encode and decode point cloud data quickly, accurately, and efficiently by attribute matching for all points in partial geometry coding.

The method/device according to the embodiments may accurately and quickly perform attribute coding of the point cloud data based on the geometry tree and direct coded point-based LoD generation according to the embodiments.

In addition, when IDCM-based geometry coding is performed in the field of scalable coding, scalable representation may be implemented for all depths or some matching depths by matching attribute information to points/nodes in a one-to-one correspondence manner according to the depth of the geometry tree.

As the transmission/reception device according to the embodiments performs the scalable attribute coding in consideration of the direct coded points according to the embodiments, scalable point cloud representation may be performed accurately.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related details have been described in the best mode for carrying out the embodiments.

As described above, the embodiments are fully or partially applicable to a point cloud transmission/reception device and system.

Those skilled in the art may change or modify the embodiments in various ways within the scope of the embodiments.

Embodiments may include variations/modifications within the scope of the claims and their equivalents.

What is claimed is:

1. A method of transmitting point cloud data, the method comprising:
   encoding geometry data of point cloud data based on an octree, wherein the octree represents points of the geometry data as a tree including nodes, wherein the octree includes a direct node having a single position of one point;

encoding attribute data of the point cloud data based on levels of detail (LODs) including levels including the points; and transmitting a bitstream containing the point cloud data, wherein the direct node is encoded without subsequent points for the direct node, wherein the direct node is added in the LODs with occupied nodes of the octree.

2. The method of claim 1, wherein the encoding of the attribute data comprises: generating the LODs.

3. The method of claim 2, wherein the generating of the LODs comprises:

based on direct coding mode-applied point cloud data not being present, generating the LODs based on the octree.

4. The method of claim 2, wherein the generating of the LODs comprises:

based on direct coding mode-applied point cloud data being present, generating a node of a depth of the LODs based on information about the direct coding mode applied point cloud data of the depth of the LODs.

5. The method of claim 2, wherein the generating of the LODs comprises:

based on direct coding mode-applied point cloud data being present, matching a node for the geometry data to a node for the attribute data without information about the direct coding mode-applied point cloud data of a depth of the LODs.

6. The method of claim 1, wherein the bitstream contains parameter information related to the point cloud data.

7. A device for transmitting point cloud data, the device comprising:

a memory; and a processor configured to execute one or more instructions in the memory which cause the processor to perform:

encoding point cloud data geometry data of point cloud data based on an octree, wherein the octree represents points of the geometry data as a tree including nodes, wherein the octree includes a direct node having a single position of one point, and encoding attribute data of the point cloud data based on levels of detail (LODs) including levels including the points, transmitting the point cloud data, wherein the direct node is encoded without subsequent points for the direct node, wherein the direct node is added in the LODs with occupied nodes of the octree.

8. The device of claim 7, wherein the processor is further configured to generate the LODs.

9. The device of claim 8, wherein, based on direct coding mode-applied point cloud data not being present, the processor is configured to generate the LODs based on an octree for the point cloud data.

10. The device of claim 8, wherein, based on direct coding mode-applied point cloud data being present, the processor is configured to generate a node of a depth of the LODs based on information about the direct coding mode applied point cloud data of the depth of the LODs.

11. The device of claim 8, wherein, based on direct coding mode-applied point cloud data being present, the processor is configured to match a node for the geometry data to a node for the attribute data without information about the direct coding mode-applied point cloud data of a depth of the LODs.

12. The device of claim 7, wherein the bitstream contains parameter information related to the point cloud data.

13. A method of receiving point cloud data, the method comprising:

receiving a bitstream containing point cloud data; and decoding geometry data of point cloud data based on an octree, wherein the octree represents points of the geometry data as a tree including nodes, wherein the octree includes a direct node having a single position of one point;

decoding attribute data of the point cloud data based on levels of detail (LODs) including levels including the points, wherein the direct node is decoded without subsequent points for the direct node, wherein the direct node is added in the LODs with occupied nodes of the octree.

14. The method of claim 1, wherein the decoding of the attribute data comprises: generating the LODs.

15. The method of claim 14, wherein the generating of the LOD comprises:

based on direct coding mode-applied point cloud data not being present, generating the LODs based on the octree.

16. The method of claim 14, wherein the generating of the LODs comprises:

based on direct coding mode-applied point cloud data being present, generating a node of a depth of the LODs based on information about the direct coding mode applied point cloud data of the depth of the LODs.

17. The method of claim 14, wherein the generating of the LODs comprises:

based on direct coding mode-applied point cloud data being present, matching a node for the geometry data to a node for the attribute data without information about the direct coding mode-applied point cloud data of a depth of the LODs.

18. The method of claim 13, wherein the bitstream contains parameter information related to the point cloud data.

19. A device for receiving point cloud data, the device comprising:

a memory; and a processor configured to execute one or more instructions in the memory which causes the processor perform:

receiving data a bitstream containing point cloud data; and decoding geometry data of point cloud data based on an octree, wherein the octree represents points of the geometry data as a tree including nodes, wherein the octree includes a direct node having a single position of one point;

decoding attribute data of the point cloud data based on levels of detail (LODs) including levels including the points, wherein the direct node is decoded without subsequent points for the direct node, wherein the direct node is added in the LODs with occupied nodes of the octree.

20. The device of claim 19,
wherein the decoding attribute data includes generating the LODs.

* * * * *